(12) United States Patent
Chattoraj et al.

(10) Patent No.: US 11,953,458 B2
(45) Date of Patent: Apr. 9, 2024

(54) SYSTEMS AND METHODS UTILIZING SENSOR SURFACE FUNCTIONALIZATION

(71) Applicant: Ecolab USA Inc., St. Paul, MN (US)

(72) Inventors: Mita Chattoraj, Warrenville, IL (US);
Michael J. Murcia, Dekalb, IL (US);
Alexander P. Mantis, Brookfield, IL (US); Craig W. Myers, Lisle, IL (US)

(73) Assignee: Ecolab USA Inc., St. Paul, MN (US)

( * ) Notice: Subject to any disclaimer, the term of this patent is extended or adjusted under 35 U.S.C. 154(b) by 445 days.

(21) Appl. No.: 16/811,842

(22) Filed: Mar. 6, 2020

(65) Prior Publication Data

US 2020/0292478 A1    Sep. 17, 2020

Related U.S. Application Data

(60) Provisional application No. 62/818,681, filed on Mar. 14, 2019.

(51) Int. Cl.
*G01K 7/18* (2006.01)
*G01K 13/00* (2021.01)
(Continued)

(52) U.S. Cl.
CPC ............... *G01N 25/00* (2013.01); *G01K 7/18* (2013.01); *G01K 13/00* (2013.01); *G01N 17/00* (2013.01); *G01K 1/12* (2013.01)

(58) Field of Classification Search
CPC .......... G01K 7/18; G01K 13/00; G01N 25/00; G01N 17/00
(Continued)

(56) References Cited

U.S. PATENT DOCUMENTS

| 413,136 A | 10/1889 | Dewey |
| 1,120,781 A | 12/1914 | Altenkirch et al. |

(Continued)

FOREIGN PATENT DOCUMENTS

| CA | 2248135 A1 * | 9/1997 |
| CA | 2445296 C | 2/2008 |

(Continued)

OTHER PUBLICATIONS

AWAD "Influence of Surface Temperature on Surface Fouling-Theoretical Approach," Life Science Journal, vol. 9, No. 3, 2012, pp. 1733-1741.

(Continued)

*Primary Examiner* — Gail Kaplan Verbitsky
(74) *Attorney, Agent, or Firm* — Fredrikson & Byron, P.A.

(57) ABSTRACT

A method for characterizing a process fluid comprising applying electrical power to a first resistance temperature detector (RTD) in contact with a fluid to increase the temperature of the first RTD; allowing the first RTD to cool toward a fluid equilibrium temperature; analyzing the temperature decay profile of the first RTD over time to determine thermal characteristics; applying electrical power to a second RTD in contact with the fluid to increase the temperature of the second RTD; allowing the second RTD to cool toward the fluid equilibrium temperature; analyzing the temperature decay profile of the second RTD over time to determine thermal characteristics; comparing the thermal characteristics of the first and second RTD to determining one or more characteristics of the fluid based; and performing a corrective action. The first RTD has a first coating and the second RTD has a second coating different than the first coating.

20 Claims, 13 Drawing Sheets

(51) Int. Cl.
*G01N 17/00* (2006.01)
*G01N 25/00* (2006.01)
*G01K 1/12* (2006.01)

(58) Field of Classification Search
USPC ...... 374/136, 148, 4, 5, 10, 29, 163, 185, 7, 374/183
See application file for complete search history.

(56) References Cited

U.S. PATENT DOCUMENTS

| | | | |
|---|---|---|---|
| 2,246,563 A | 6/1941 | Winters | |
| 2,899,281 A * | 8/1959 | Olmer | G01N 25/48 422/96 |
| 3,111,031 A | 11/1963 | Kuritza | |
| 3,153,577 A * | 10/1964 | McCully | G01N 25/48 436/147 |
| 3,321,696 A | 5/1967 | Zenmon et al. | |
| 3,572,092 A | 3/1971 | Zernow | |
| 3,724,267 A | 4/1973 | Zoschak | |
| 3,834,357 A | 9/1974 | Kaczmarek et al. | |
| 4,080,821 A * | 3/1978 | Johnston | G01F 1/698 73/25.03 |
| 4,138,878 A | 2/1979 | Holmes et al. | |
| 4,164,699 A * | 8/1979 | Timoshenko | G01N 27/16 340/634 |
| 4,346,587 A | 8/1982 | Brindak | |
| 4,383,438 A | 5/1983 | Eaton | |
| 4,399,687 A * | 8/1983 | Collins | G01N 25/32 73/25.01 |
| 4,514,096 A | 4/1985 | Wynnyckyj et al. | |
| 4,570,881 A | 2/1986 | Lustenberger | |
| 4,615,302 A | 10/1986 | Wynnyckyj et al. | |
| 4,671,072 A | 6/1987 | Starck et al. | |
| 4,718,774 A | 1/1988 | Slough | |
| 4,722,610 A | 2/1988 | Levert et al. | |
| 4,832,715 A | 5/1989 | Naruse | |
| 4,859,076 A | 8/1989 | Twerdochlib | |
| 4,901,061 A | 2/1990 | Twerdochlib | |
| 4,967,593 A | 11/1990 | McQueen | |
| 5,177,696 A | 1/1993 | Bonne | |
| 5,248,198 A | 9/1993 | Droege | |
| 5,360,549 A | 11/1994 | Mouche et al. | |
| 5,590,706 A | 1/1997 | Tsou et al. | |
| 5,610,331 A | 3/1997 | Georgi | |
| 5,661,233 A | 8/1997 | Spates et al. | |
| 5,709,470 A | 1/1998 | Finley | |
| 5,827,952 A | 10/1998 | Mansure et al. | |
| 5,984,641 A | 11/1999 | Bevan et al. | |
| 5,992,505 A | 11/1999 | Moon | |
| 6,023,969 A | 2/2000 | Feller | |
| 6,035,726 A | 3/2000 | Bernard et al. | |
| 6,053,032 A | 4/2000 | Kraus et al. | |
| 6,062,069 A | 5/2000 | Panchal et al. | |
| 6,250,140 B1 | 6/2001 | Kouznetsov et al. | |
| 6,328,467 B1 | 12/2001 | Keyhani | |
| 6,386,272 B1 | 5/2002 | Starner et al. | |
| 6,432,168 B2 | 8/2002 | Schonauer | |
| 6,499,876 B1 * | 12/2002 | Baginksi | G01N 17/008 374/7 |
| 6,666,905 B2 | 12/2003 | Page et al. | |
| 6,789,938 B2 | 9/2004 | Sandu et al. | |
| 6,886,393 B1 | 5/2005 | Romanet et al. | |
| 6,960,018 B2 | 11/2005 | Sandu et al. | |
| 7,077,563 B2 | 7/2006 | Xiao et al. | |
| 7,082,825 B2 | 8/2006 | Aoshima et al. | |
| 7,581,874 B2 | 9/2009 | Hays et al. | |
| 7,594,430 B2 | 9/2009 | Beardwood et al. | |
| 7,740,402 B2 * | 6/2010 | Camp | G01F 1/699 374/45 |
| 8,109,161 B2 | 2/2012 | Jovancicevic et al. | |
| 8,147,130 B2 | 4/2012 | Sakami et al. | |
| 8,274,655 B2 | 9/2012 | Herzog | |
| 8,360,635 B2 | 1/2013 | Huang et al. | |
| 8,517,600 B2 | 8/2013 | Wan et al. | |
| 8,672,537 B2 | 3/2014 | Veau et al. | |
| 8,746,968 B2 | 6/2014 | Auret et al. | |
| 9,151,204 B2 | 10/2015 | Hashida et al. | |
| 9,176,044 B2 | 11/2015 | Bosbach et al. | |
| 9,207,002 B2 | 12/2015 | Campbell et al. | |
| 9,289,525 B1 | 3/2016 | Mansor et al. | |
| 9,506,883 B2 | 11/2016 | Takahashi et al. | |
| 9,939,395 B2 | 4/2018 | Wolferseder | |
| 2001/0013220 A1 | 8/2001 | Schonauer | |
| 2001/0035044 A1 | 11/2001 | Larsson et al. | |
| 2001/0051108 A1 | 12/2001 | Schonauer | |
| 2002/0111282 A1 | 8/2002 | Charaf et al. | |
| 2003/0062063 A1 * | 4/2003 | Sandu | F28F 19/008 134/1 |
| 2004/0009605 A1 * | 1/2004 | Brown | B01D 53/8687 422/94 |
| 2004/0052963 A1 | 3/2004 | Ivanov et al. | |
| 2004/0139799 A1 | 7/2004 | Sudolcan et al. | |
| 2004/0144403 A1 | 7/2004 | Sandu et al. | |
| 2005/0053117 A1 * | 3/2005 | O'Neill | G01K 1/20 374/170 |
| 2007/0025413 A1 | 2/2007 | Hays et al. | |
| 2007/0080075 A1 | 4/2007 | Wang et al. | |
| 2007/0085670 A1 | 4/2007 | Peluso | |
| 2007/0189356 A1 * | 8/2007 | Pettit | C23C 16/4412 374/7 |
| 2008/0190173 A1 | 8/2008 | Wienand et al. | |
| 2008/0264464 A1 | 10/2008 | Lee et al. | |
| 2008/0291965 A1 | 11/2008 | Wolferseder | |
| 2009/0000764 A1 | 1/2009 | Tochon et al. | |
| 2009/0094963 A1 | 4/2009 | Mizoguchi et al. | |
| 2009/0260987 A1 | 10/2009 | Valdes et al. | |
| 2010/0064769 A1 | 3/2010 | Wang | |
| 2010/0084269 A1 | 4/2010 | Wang et al. | |
| 2010/0270620 A1 | 10/2010 | Dibra et al. | |
| 2010/0272993 A1 | 10/2010 | Volinsky et al. | |
| 2011/0132064 A1 | 6/2011 | Kramer et al. | |
| 2011/0283773 A1 | 11/2011 | Suzuki | |
| 2011/0283780 A1 | 11/2011 | Bosbach et al. | |
| 2011/0286492 A1 | 11/2011 | Auret et al. | |
| 2011/0308548 A1 * | 12/2011 | Amundsen | G01B 21/085 374/7 |
| 2011/0310927 A1 * | 12/2011 | Bombardieri | H05B 3/82 374/185 |
| 2012/0051399 A1 * | 3/2012 | Rud | G01K 15/00 374/185 |
| 2013/0031973 A1 | 2/2013 | Kirst et al. | |
| 2013/0086923 A1 | 4/2013 | Petrovski et al. | |
| 2013/0144503 A1 | 6/2013 | Nishijima et al. | |
| 2013/0232956 A1 | 9/2013 | Loman et al. | |
| 2013/0256296 A1 | 10/2013 | Hocken et al. | |
| 2014/0346041 A1 | 11/2014 | Nishijima | |
| 2015/0020580 A1 | 1/2015 | Hoffman et al. | |
| 2015/0023393 A1 | 1/2015 | Britton et al. | |
| 2015/0212024 A1 * | 7/2015 | Banks | G01N 27/30 73/61.61 |
| 2015/0268078 A1 | 9/2015 | Zhang et al. | |
| 2015/0291993 A1 | 10/2015 | Vela et al. | |
| 2015/0308875 A1 | 10/2015 | Muller et al. | |
| 2015/0355076 A1 | 12/2015 | Aton et al. | |
| 2016/0017780 A1 | 1/2016 | Kinugawa et al. | |
| 2016/0017830 A1 | 1/2016 | Wienand et al. | |
| 2016/0025801 A1 | 1/2016 | Kim et al. | |
| 2016/0061691 A1 | 3/2016 | Stojicevic et al. | |
| 2017/0052133 A1 | 2/2017 | Opdahl | |
| 2017/0112319 A1 * | 4/2017 | Kelly | F24H 1/101 |
| 2017/0138646 A1 | 5/2017 | Ihnfeldt et al. | |
| 2018/0073996 A1 | 3/2018 | Chattoraj et al. | |
| 2018/0245865 A1 | 8/2018 | Chattoraj et al. | |
| 2019/0162096 A1 | 5/2019 | Hoehne et al. | |
| 2022/0130780 A1 * | 4/2022 | Jensen | H01L 24/03 |

FOREIGN PATENT DOCUMENTS

| | | |
|---|---|---|
| CN | 202013330 U | 10/2011 |
| CN | 104995501 A | 10/2015 |
| FR | 2788600 A1 | 7/2000 |
| JP | H07229865 A | 8/1995 |

(56) References Cited

FOREIGN PATENT DOCUMENTS

| JP | H11153559 A | 6/1999 | |
|----|----|----|----|
| JP | 2002521661 A | 7/2002 | |
| JP | 4093099 B2 * | 5/2008 | |
| JP | 2009109504 A * | 5/2009 | ........... G01N 27/123 |
| JP | 2013231692 A | 11/2013 | |
| KR | 101831682 B1 * | 2/2018 | |
| RU | 2223548 C2 | 2/2004 | |
| RU | 2700349 C1 | 9/2019 | |
| WO | 0043762 A1 | 7/2000 | |
| WO | 0204290 A1 | 1/2002 | |
| WO | 2008157418 A1 | 12/2008 | |
| WO | 2009135504 A1 | 11/2009 | |
| WO | 2010087724 A1 | 8/2010 | |
| WO | 2013092820 A1 | 6/2013 | |
| WO | 2013141438 A1 | 9/2013 | |
| WO | WO-2015195421 A1 * | 12/2015 | ........... G06F 1/6888 |
| WO | 2016097723 A1 | 6/2016 | |
| WO | 2016139563 A1 | 9/2016 | |

OTHER PUBLICATIONS

"Introduction to the DATS Fouling Monitor Technology," Bridger Scientific Inc., 2011, 10 pages.

Miquel et al., "Anti-biofilm Activity as a Health Issue," Frontiers in Microbiology, vol. 7, Article 592, Apr. 2016, 14 pages.

Sincic et al., "Novel Fouling Measurement Device," Chemical and Biochemical Engineering Quarterly, vol. 28, No. 4, 2014, pp. 465-472.

"Tomographic Applications for Oil & Gas Industry," Rocsole Ltd, 2014, 53 pages.

Wassmann et al., "The influence of surface texture and wettability on initial bacterial adhesion on titanium and zirconium oxide dental implants," International Journal of Implant Dentistry, vol. 3, No. 1, Dec. 2017, 11 pages.

International Patent Application No. PCT/US2020/021781, International Search Report and Written Opinion dated Jul. 15, 2020, 14 pages.

Machine Translation of RU-2700349-C1, 5 pages, mailed in U.S. Appl. No. 17/549,625, filed Nov. 2, 2023.

* cited by examiner

|         | Temp 1 | Temp 2 | ... | Temp N |
|---------|--------|--------|-----|--------|
| Surface 1 |      |        |     |        |
| Surface 2 |      |        |     |        |
| ...       |      |        |     |        |
| Surface M |      |        |     |        |

FIG. 12

SYSTEMS AND METHODS UTILIZING SENSOR SURFACE FUNCTIONALIZATION

RELATED APPLICATION

This application claims the benefit of U.S. Provisional Application No. 62/818,681, filed Mar. 14, 2019, the content of which is hereby incorporated by reference in its entirety.

BACKGROUND

Various fluid flow systems are arranged to flow a process fluid from one or more input fluid sources toward a use device. For example, fluid flowing toward a heat exchanger surface can be used to transfer heat to or draw heat from the heat exchange surface and maintain the surface at an operating temperature.

In some examples, changes in the operating conditions of the fluid flow system, such as changes in the makeup of the fluid, operating temperatures of the fluid or the use device, or the like, can affect the likelihood of deposits forming from the process fluid onto system components. Deposits forming on the use device can negatively impact the performance of the device. For example, deposits forming on the heat exchange surface can act to insulate the heat exchange surface from the fluid, reducing the ability of the fluid to thermally interact with the heat exchanger.

Often, such deposits are detected only when the performance of the use device degrades to the point of requiring attention. For example, a heat exchanger surface can become unable to maintain desired temperatures due to a sufficiently large deposit forming on a heat exchange surface thereof. In order to restore the system to working order, the system often must be shut down, disassembled, and cleaned, which can be a costly and time-consuming process.

Additionally or alternatively, deposits can be indicative of properties of the fluid flowing through the system.

SUMMARY OF THE INVENTION

Certain embodiments of the invention include a system comprising a first resistance temperature detector (RTD) having a first coating, a power source, and a controller. The power source may be in communication with the first RTD and also can be configured to provide electrical power to the first RTD. The controller may be in communication with the first RTD and the power source. The controller may be configured to cause the power source to provide electrical power to the first RTD and stop applying electrical power to the first RTD. Additionally, the controller can be configured to measure the temperature of the first RTD over time, such as after stopping applying the electrical power to the first RTD; measure a thermal characteristic of the first RTD based on the measured temperature over time; and determine one or more characteristics of a fluid in contact with the first RTD based on the measured thermal characteristic of the first RTD. In some embodiments, the thermal characteristic may comprise one or more of a thickness of deposit formed on the RTD, a rate of change of the thickness of the deposit formed on the RTD, a temperature decay profile, or the like. In some embodiments, the one or more characteristics of the fluid may comprise a concentration of a constituent in the fluid, the presence of microbes in the fluid, a corrosivity the fluid, or the like.

In some embodiments, the system may comprise a second RTD having a coating different than the first coating wherein the controller can be further configured to cause the power source to provide electrical power to the second RTD; stop applying electrical power to the second RTD; measure the temperature of the second RTD, such as over time after stopping applying the electrical power to the second RTD; measure a thermal characteristic of the second RTD, such as based on the measured temperature over time. The controller may then be further configured to compare the measured thermal characteristic of the second RTD to the measured characteristic of the first RTD, wherein the determining one or more characteristics of the fluid can be based on the comparison between the thermal characteristics of the first RTD and the second RTD. Additionally or alternatively, the controller may be configured to compare the measured thermal characteristic of the first RTD to a baseline characteristic of the first RTD and determining the one or more characteristics of the fluid can be based on the comparison.

Certain embodiments of the invention include a method for characterizing a process fluid. The method may comprise applying electrical power to a first RTD in contact with a fluid to increase the temperature of the first RTD and allowing the first RTD to cool toward a first equilibrium temperature, the first RTD may also comprise a first coating. The method may further comprise analyzing the temperature decay profile of the first RTD over time as it cools toward the fluid equilibrium temperature to determine one or more thermal characteristics of the first RTD. Additionally, the method may comprise applying electrical power to a second RTD in contact with the fluid to increase the temperature of the second RTD and allowing the second RTD to cool toward the fluid equilibrium temperature; the second RTD may also have a second coating different than the first coating. The method can further comprise analyzing the temperature decay profile of the second RTD over time as it cools toward the fluid equilibrium temperature to determine one or more thermal characteristics of the second RTD; comparing the thermal characteristics of the first RTD and the second RTD; determining one or more characteristics of the fluid based on the comparison; and performing a corrective action in response to the determined one or more characteristics.

In some embodiments, the first coating and second coating may comprise a plurality of coatings and/or characteristics. For example, the first coating can comprise an antimicrobial material and the second coating may not be antimicrobial. In such examples, performing the corrective action can comprise adding a biocide to the fluid. Additionally or alternatively, examples may include: the first coating can be hydrophobic and the second coating can be hydrophilic; the first coating can be roughened and the second coating can be smooth; the first coating can be metallized and the second coating can have a surface that is inert; and the first coating can have a surface with high wettability and the second coating can have a surface with a low wettability.

Additionally or alternatively, the determined thermal characteristics of the first RTD comprise a thickness of a first deposit formed on the first RTD; the determined thermal characteristics of the second RTD comprise a thickness of a second deposit formed on the second RTD; and comparing the thermal characteristics of the first RTD and the second RTD comprises comparing the thickness of the first deposit and the thickness of the second deposit. In such embodiments, the determined one or more characteristics of the fluid can be based on the comparison of the thickness of the first deposit and the thickness of the second deposit and differences between the first coating and the second coating. Additionally or alternatively, the determined thermal characteristics of the first RTD may comprise a rate of change of the thickness of the first deposit formed on the first RTD and the determined thermal characteristics of the second RTD comprises a rate of change of the thickness of the second deposit formed on the second RTD.

Further embodiments can include determining a temperature dependence of deposit formation on the first RTD and the second RTD. In such examples, determining temperature dependence of deposit formation on the first RTD and the second RTD comprises applying electrical power to a third RTD in contact with the fluid to maintain the temperature of the third RTD at a temperature above the fluid equilibrium temperature of the fluid and allowing the third RTD to cool toward the fluid equilibrium temperature. In some embodiments, the third RTD may have the first coating. Additionally, the method may comprise analyzing the temperature decay profile of the third RTD over time as it cools toward the fluid equilibrium temperature to determine one or more third characteristics of the third RTD and comparing the thermal characteristics of the first RTD and the third RTD.

The details of one or more embodiments of the invention are set forth in the accompanying drawings and the description below. Other features, objects, and advantages will be apparent from the description and drawings, and from the claims.

BRIEF DESCRIPTION OF THE DRAWINGS

FIG. 12 shows an example lookup table for a plurality of surface characteristics and temperatures.

DETAILED DESCRIPTION

A resistance temperature detector (RTD) is a device commonly used to measure the temperature of an object of interest. For example, in some instances, the resistance of the RTD is approximately linear with respect to temperature. The resistance can be measured by passing a current through the RTD and measuring the resulting voltage across the RTD. A current flowing through the RTD can have heating effects on the RTD, so the current is typically maintained at a relatively low magnitude during a temperature measurement. In exemplary operation, a small amount of current is passed through a conductor that is exposed to some environment where temperature is to be measured. As temperature changes, the characteristic change in resistance in that conductor (e.g., platinum) is measured and used to calculate the temperature.

Figure 1:
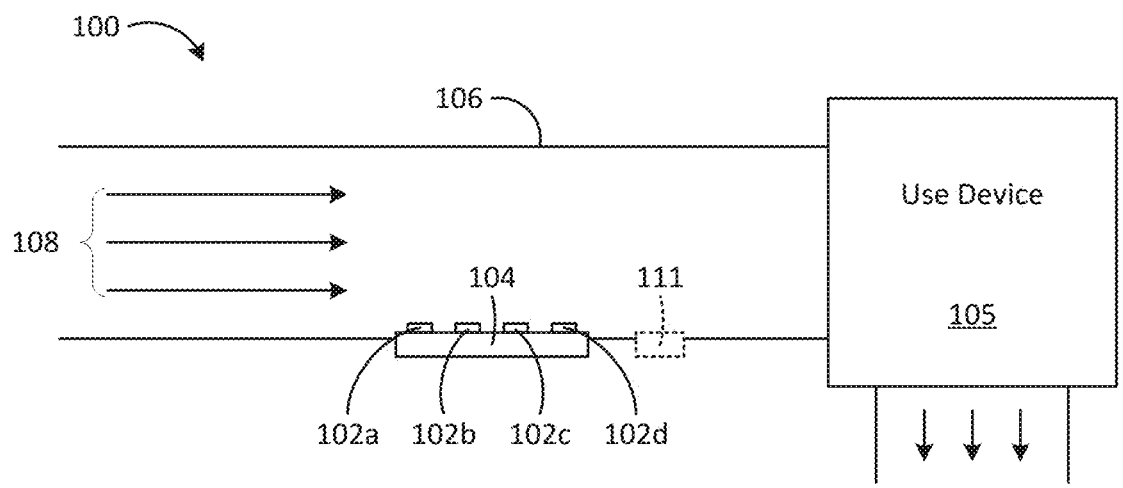
FIG. 1 is an illustration of an exemplary placement of one or more RTDs in a fluid flow system.

FIG. 1 is an illustration of an exemplary placement of one or more RTDs in a fluid flow system. As shown, RTDs 102a-d are positioned in the flow path 106 of a process fluid in a fluid flow system 100 configured to direct a process fluid to a use device 105. Arrows 108 illustrate an exemplary flow path of fluid from a fluid source toward the use device 105. As described herein process fluids can generally relate to any fluids flowing through such a fluid flow system, including but not limited to utility fluids such as cooling water, boiler feed water, condensate, blowdown water, waste water, and discharged effluent water. Such exemplary process fluids can be directed into the fluid flow system 100 from a variety of sources (e.g., an effluent stream from a process, boiler blowdown water, treated waste water, produced water, a fresh water source, etc.). Other examples of fluids include, for example, a hydrocarbon stream. In some examples, a single fluid flow system 100 can receive input process fluids from a variety of sources. In some such examples, the source of process fluid can be selected, such as via a manual and/or automated valve or series of valves. In some embodiments, a single fluid source can be selected from one or more possible input sources. In alternative embodiments, a plurality of fluid sources can be selected such that fluid from the selected plurality of sources is mixed to form the input fluid. In some implementations, a default input fluid is made up of a mixture of fluids from each of the plurality of available input sources, and the makeup of the input fluid can be adjusted by blocking the flow of one or more such input sources into the system. In some examples, one or more fluids flowing in the fluid flow system can be single phase fluids (e.g., liquid or gas) or can include multiphase fluids.

In the example of FIG. 1, RTDs 102a-d are shown as an array of RTDs mounted on a sample holder 104. In some examples, sample holder 104 is removable from the flow path 106 of the fluid flow system 100, for example, to facilitate cleaning, replacing, or other maintenance of RTDs 102a-d. Additionally or alternatively, one or more RTDs (e.g. positioned on a sample holder) can be positioned in the flow path of one or more fluid inputs that contribute to the makeup of the fluid flowing through the fluid flow system 100 to the use device 105. The fluid flow system can be any system in which a process fluid flows, including for example, washing systems (e.g., warewashing, laundry, etc.), food and beverage systems, mining, energy systems (e.g., oil wells, refineries, etc.), air flow through engine air intakes, heat exchange systems such as cooling towers or boilers, pulp and paper processes, and others. Arrows 108 indicate the direction of flow of the fluid past the RTDs 102, which can be used to monitor the temperature of the fluid, and toward the use device 105.

In some embodiments, a fluid flow system comprises one or more additional sensors 111 (shown in phantom) capable of determining one or more parameters of the fluid flowing through the system. In various embodiments, one or more additional sensors 111 can be configured to determine flow rate, temperature, pH, alkalinity, conductivity, and/or other fluid parameters, such as the concentration of one or more constituents of the process fluid. While shown as being a single element positioned downstream of the RTDs 102a-d, one or more additional sensors 111 can include any number of individual components, and may be positioned anywhere in the fluid flow system 100 while sampling the same fluid as RTDs 102a-d.

Figure 2:
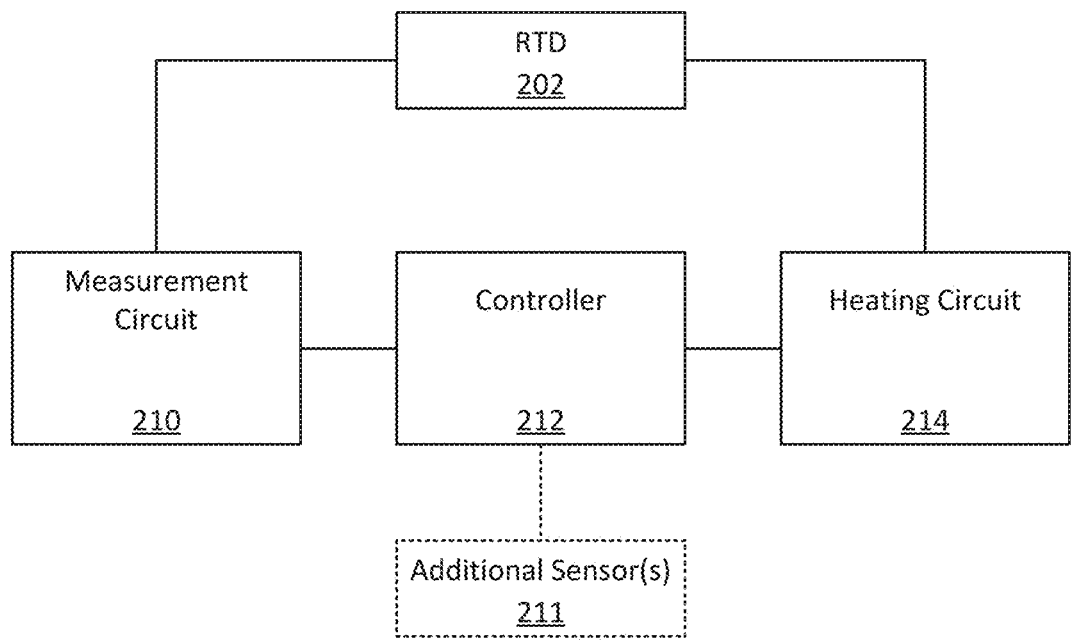
FIG. 2 is a schematic diagram of a system for operating an RTD in an exemplary embodiment.

FIG. 2 is a schematic diagram of a system for operating an RTD in an exemplary embodiment. In the embodiment of FIG. 2, an RTD 202 is in communication with a measurement circuit 210. In some examples, the measurement circuit 210 can facilitate the measurement of the resistance of the RTD in order to determine the temperature thereof. For instance, in an exemplary embodiment, the measurement circuit can provide a current to flow through the RTD and measure the voltage drop across the RTD to determine the resistance, and thus the temperature, thereof.

The system can include a controller 212 in communication with the measurement circuit 210. The controller 212 can include a microcontroller, a processor, memory comprising operating/execution instructions, a field programmable gate array (FPGA), and/or any other device capable of interfacing and interacting with system components. In some such examples, the system can operate in a measurement mode in which the controller 212 can interface with the measurement circuit 210 for determining a temperature of the RTD 202. In some examples, the controller can cause a current to be applied to the RTD via the measurement circuit 210, receive a signal from the measurement circuit 210 representative of the voltage across the RTD 202, and determine the resistance of the RTD based on the known current and measured voltage. In some embodiments, the controller 212 is configured to otherwise determine the resistance and/or the temperature of the RTD 202 based on the signal received from the measurement circuit. Thus, in some such examples, the controller 212 can interface with the measurement circuit 210 and the RTD 202 to determine the temperature of the RTD 202.

The system of FIG. 2 further comprises a heating circuit 214 in communication with the controller 212 and the RTD 202. In some examples, system can operate in a heating mode in which the controller 212 can apply electrical power to the RTD 202 via the heating circuit 214 in order to elevate the temperature of the RTD 202. In some such embodiments, the controller 212 is capable of adjusting or otherwise controlling the amount of power applied to the RTD 202 in order to elevate the temperature of the RTD 202. In various examples, adjusting the applied power can include adjusting a current, a voltage, a duty cycle of a pulse-width modulated (PWM) signal, or other known methods for adjusting the power applied to the RTD 202.

In some examples, the controller 212 is capable of interfacing with the RTD 202 via the heating circuit 214 and the measurement circuit 210 simultaneously. In some such examples, the system can simultaneously operate in heating mode and measurement mode. Similarly, such systems can operate in the heating mode and in the measurement mode independently, wherein the RTD may be operated in the heating mode, the measurement mode, or both simultaneously. In other examples, the controller 212 can switch between a heating mode and a measurement mode of operation. Additionally or alternatively, a controller in communication with a plurality of RTDs 202 via one or more measurement circuits 210 and one or more heating circuits 214 can operate such RTDs in different modes of operation. In various such examples, the controller 212 can operate each RTD in the same mode of operation or separate modes of operation, and/or may operate each RTD individually, for example, in a sequence. Many implementations are possible and within the scope of the present disclosure.

As described with respect to FIG. 1, the system can include one or more additional sensors 211 for determining one or more parameters of the fluid flowing through the fluid flow system. Such additional sensors 211 can be in wired or wireless communication with the controller 212. Thus, in some embodiments, the controller 212 can be configured to interface with both RTDs 202 and additional sensors 211 positioned within the fluid flow system.

Figure 3:
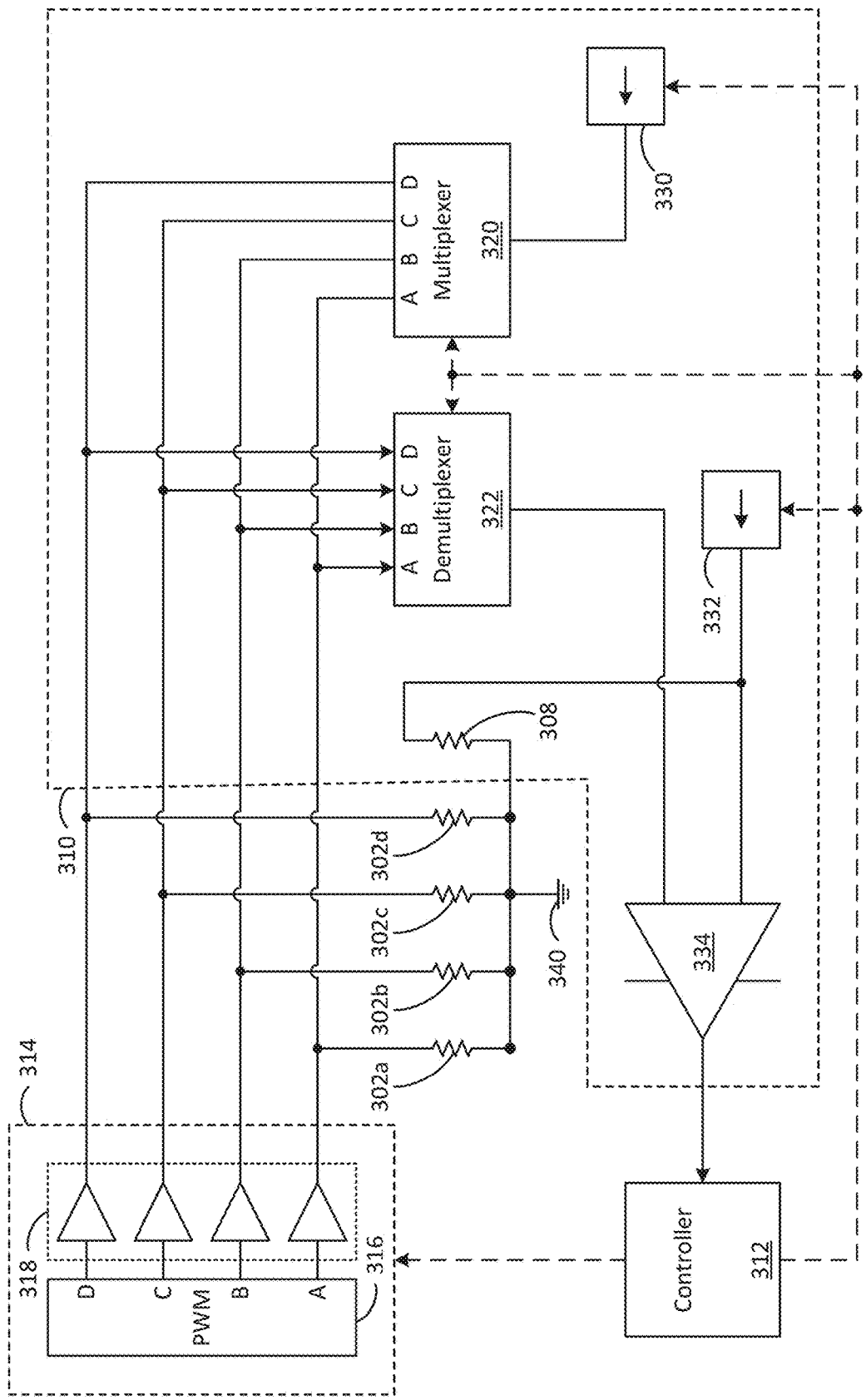
FIG. 3 is an exemplary schematic diagram showing an operational configuration of an array of RTDs.

FIG. 3 is an exemplary schematic diagram showing an operational configuration of an array of RTDs. In the illustrated embodiment, a series of RTDs 302a-d are in communication with a controller 312 via a measurement circuit 310 and a heating circuit 314. During a heating mode of operation, the controller 312 can cause the heating circuit 314 to provide electrical power to one or more of the RTDs 302a-d to elevate the temperature of the RTD. In the illustrated embodiment, the heating circuit 314 includes a PWM module 316 in communication with an amplification stage 318. In the example of FIG. 3, the PWM module 316 includes a plurality of channels A-D, each channel corresponding to a respective RTD 302a-d in the series of RTDs. Each channel of the PWM module 316 is in communication with its corresponding RTD 302a-d via the amplification stage 318. The amplification stage 318 can be configured to modify the signal from the PWM module 316 to generate a heating signal applied to the respective RTD 302a-d. In some examples, the amplification stage 318 is configured to filter a PWM signal from the PWM module 316, for example, via an LRC filter, in order to provide a steady power to the RTD 302. Additionally or alternatively, the amplification stage 318 can effectively amplify a signal from the PWM module 316 for desirably changing the temperature of the RTD 302.

In an exemplary heating operation embodiment, the controller signals the PWM module 316 to elevate the temperature of an RTD 302a. The controller 312 can cause the PWM module 316 to output a PWM signal from channel A to the amplification stage 318. Aspects of the PWM signal, such as the duty cycle, magnitude, etc. can be adjusted by the controller 312 to meet desired heating effects. Additionally or alternatively, the amplification stage 318 can adjust one or more aspects of channel A of the PWM signal to effectively control the amount of heating of the RTD 302a. Similar heating operations can be performed for any or all of RTDs 302a-d simultaneously. In some embodiments, the controller 312 can control heating operation of each of a plurality of RTDs 302a-d such that each of the RTDs is elevated to a different operating temperature.

As described elsewhere herein, the controller 312 can be capable of interfacing with one or more RTDs 302a-d via a measurement circuit 310. In some such examples, the controller 312 can determine, via the measurement circuit 310, a measurement of the temperature of the RTD 302a-d. Since the resistance of an RTD is dependent on the temperature thereof, in some examples, the controller 312 can be configured to determine the resistance of the RTD 302a-d and determine the temperature therefrom. In the illustrated embodiment, the measurement circuit 310 comprises a current source 330 (e.g., a precision current source) capable of providing a desired current through one or more of the RTDs 302a-d to ground 340. In such an embodiment, a measurement of the voltage across the RTD 302a-d can be combined with the known precision current flowing therethrough to calculate the resistance, and thus the temperature, of the RTD 302a-d. In some examples, the current provided to the RTDs from the current source 330 is sufficiently small (e.g., in the microamp range) so that the current flowing through the RTD does not substantially change the temperature of the RTD.

In configurations including a plurality of RTDs 302a-d, the controller 312 can interface with each of the RTDs 302a-d in a variety of ways. In the exemplary embodiment of FIG. 3, the measurement circuit 310 comprises a multiplexer 320 in communication with the controller 312, the current source 330 and the RTDs 302a-d. The controller 312 can operate the multiplexer 320 so that, when a measurement of the voltage across one of the RTDs (e.g., 302a) is desired, the multiplexer 320 directs the current from the current source 330 through the desired RTD (e.g., 302a). As shown, the exemplary multiplexer 320 of FIG. 3 includes channels A, B, C, and D in communication to RTDs 302a, 302b, 302c, and 302d, respectively. Thus, when measuring the temperature of a particular one of RTDs 302a-d, the controller 312 can cause current to be supplied from the current source 330 and through the appropriate channel of the multiplexer 320 and through the desired RTD 302a-d to ground 340 in order to cause a voltage drop thereacross.

In order to measure the voltage drop across a desired one of the plurality of RTDs 302a-d, the measurement circuit 310 includes a demultiplexer 322 having channels A, B, C, and D corresponding to RTDs 302a, 302b, 302c, and 302d, respectively. The controller 312 can direct the demultiplexer 322 to transmit a signal from any one of respective channels A-D depending on the desired RTD. The output of the demultiplexer 322 can be directed to the controller 312 for receiving the signal indicative of the resistance, and therefore the temperature, of a desired RTD. For example, in some embodiments, the output of the demultiplexer 322 does not connect or otherwise has high impedance to ground. Accordingly, current flowing to an RTD (e.g., 302a) via a respective multiplexer 320 channel (e.g., channel A) will only flow through the RTD. The resulting voltage across the RTD (e.g., 302a) will similarly be present at the respective input channel (e.g., channel A) of the demultiplexer 322, and can be output therefrom for receiving by the controller 312. In some examples, instead of being directly applied to controller 312, the voltage across the RTD (e.g., 302a) at the output of the demultiplexer 322 can be applied to a first input of a differential amplifier 334 for measuring the voltage. The amplifier 334 can be used, for example, to compare the voltage at the output of the demultiplexer 322 to a reference voltage before outputting the resulting amplification to the controller 312. Thus, as described herein, a signal output from the demultiplexer 322 for receiving by the controller 312 can, but need not be received directly by the controller 312. Rather, in some embodiments, the controller 312 can receive a signal based on the signal at the output of the demultiplexer 322, such as an output signal from the amplifier 334 based on the output signal from the demultiplexer 322.

In some examples, the measurement circuit 310 can include a reference resistor 308 in line between a second current source 332 and ground 340. The current source 332 can provide a constant a known current through the reference resistor 308 of a known resistance to ground, causing a constant voltage drop across the reference resistor 308. The constant voltage can be calculated based on the known current from the current source 332 and the known resistance of the reference resistor 308. In some examples, the reference resistor 308 is located in a sensor head proximate RTDs 302a-d and is wired similarly to RTDs 302a-d. In some such embodiments, any unknown voltage drop due to unknown resistance of wires is for the reference resistor 308 and any RTD 302a-d is approximately equal. In the illustrated example, reference resistor 308 is coupled on one side to ground 340 and on the other side to a second input of the differential amplifier 334. Thus, the current source 332 in combination with the reference resistor 308 can act to provide a known and constant voltage to the second input of the differential amplifier 334 (e.g., due to the reference resistor 308, plus the variable voltage due to the wiring). Thus, in some such examples, the output of differential amplifier 334 is unaffected by wiring resistance, and can be fed to the controller 312.

As shown in the illustrated embodiment and described herein, the differential amplifier 334 can receive the voltage across the RTD (e.g., 302a) from the output of the demultiplexer 322 at one input and the reference voltage across the reference resistor 308 at its other input. Accordingly, the output of the differential amplifier 334 is indicative of the voltage difference between the voltage drop across the RTD and the known voltage drop across the reference resistor 308. The output of the differential amplifier 334 can be received by the controller 312 for ultimately determining the temperature of the RTD (e.g., 302a). It will be appreciated that, while an exemplary measurement circuit is shown in FIG. 3, measuring the temperature of the RTD could be performed in any variety of ways without departing from the scope of this disclosure. For example, the voltage drop across the RTD could be received directly by the controller 312 as an analog input signal. Additionally or alternatively, a relaxation time of an RC circuit having a known capacitance, C, and a resistance, R, being the resistance of the RTD can be used to determine the resistance of the RTD. In some such examples, such a measurement can eliminate any resistance effect of any wires without using a reference (e.g., reference resistor 308).

In some embodiments, the controller 312 can operate the multiplexer 320 and the demultiplexer 322 in concert so that it is known which of the RTDs is being analyzed. For instance, with respect to the illustrative example of FIG. 3, the controller 312 can operate the multiplexer 320 and the demultiplexer 322 on channel A so that the current from current source 330 flows through the same RTD 302a that is in communication with the differential amplifier 334 via the demultiplexer 322.

In an exemplary configuration such as shown in FIG. 3, in which a plurality of RTDs 302a-d are in communication with different channels of the multiplexer 320 and the demultiplexer 322, the controller 312 can act to switch operating channels of the multiplexer 320 and demultiplexer 322 in order to perform temperature measurements of each of the RTDs 302a-d. For instance, in an exemplary embodiment, the controller can cycle through respective multiplexer 320 and demultiplexer 322 channels in order to perform temperature measurements of each of the respective RTDs 302a-d.

As described elsewhere herein, in some examples, the controller 312 can control heating operation of one or more RTDs. In some such embodiments, the controller 312 stops heating an RTD prior to measuring the temperature of the RTD via the multiplexer 320 and demultiplexer 322. Similarly, when heating an RTD via the heating circuit 314, the controller 312 can turn off the channel(s) associated with that RTD in the multiplexer 320 and demultiplexer 322. In some embodiments, for each individual RTD, the controller 312 can use the heating circuit 314 and the measurement circuit 310 (including the multiplexer 320 and demultiplexer 322) to switch between distinct heating and measurement modes of operation.

Figure 4:
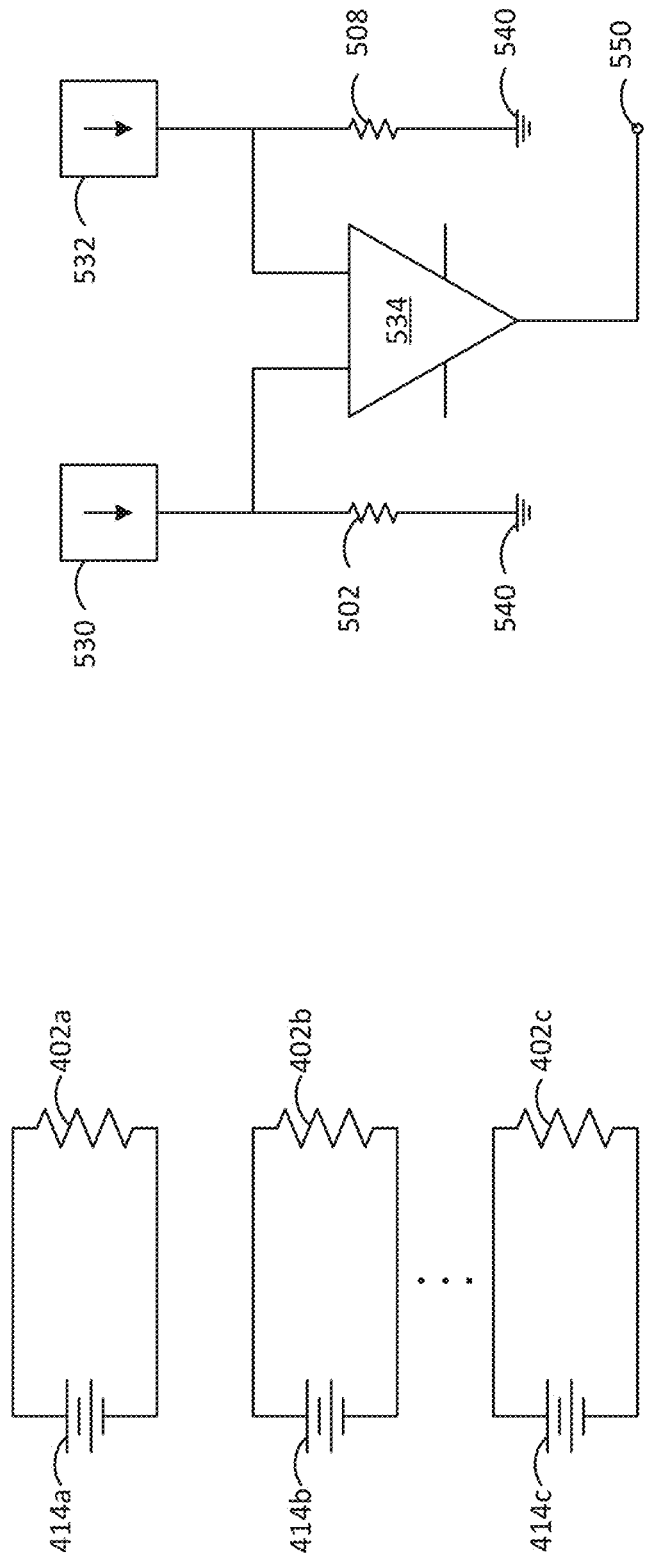
FIG. 4 is a schematic diagram showing operation of a plurality of RTDs in a heating mode of operation.

FIG. 4 is a schematic diagram showing operation of a plurality of RTDs in a heating mode of operation. As shown, each of a plurality of RTDs 402a-c is in communication with a respective power source 414a-c. As described with reference to FIG. 3, in some examples, each RTD 402a-c is not affected by any measurement circuit components while operating in the heating mode. Thus, each RTD 402a-c can be individually and independently heated via power sources 414a-c. While shown as being DC power sources in the embodiment of FIG. 4, it will be appreciated that any of a variety of adjustable power sources can be used. In some examples, the power source 414a-c comprises a PWM signal filtered and smoothed to provide a substantially DC signal. While shown as being separate power sources 414a-c, in some embodiments, a single component can be used to independently provide adjustable power to each RTD 402a-c.

Figure 5:
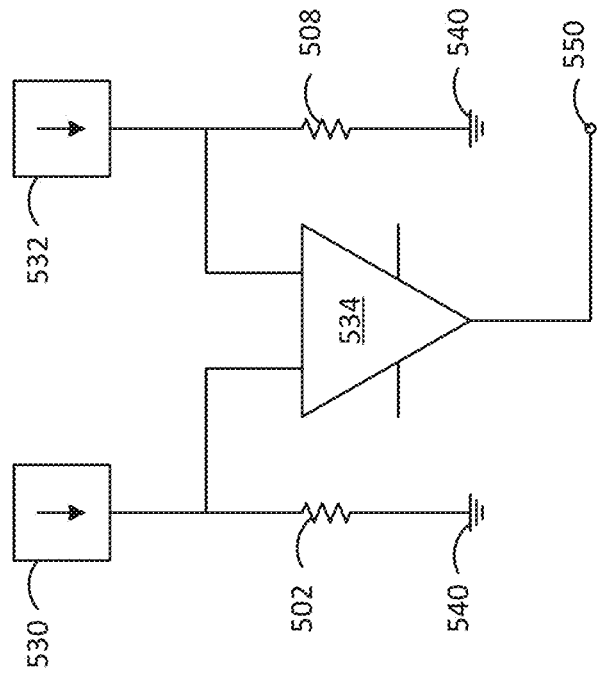
FIG. 5 is a schematic diagram showing operation of a single of RTDs in a measurement mode of operation.

FIG. 5 is a schematic diagram showing operation of a single of RTDs in a measurement mode of operation. In the illustrated embodiment, a current source 530 is configured to provide a constant current flow through RTD 502 to ground 540. The voltage drop across the RTD 502 is applied to a first input of an amplifier 534. A current source 532 is configured to provide a constant current flow through a reference resistor 508 to ground 540. As described elsewhere herein, the known current from the current source 532 and the known resistance of the reference resistor 508 can be used to determine the voltage drop across the reference resistor 508, which is applied at a second input of the amplifier 534. The output 550 of the amplifier 534 can provide information regarding the difference between the known voltage drop across the reference resistor 508 and the voltage drop across the RTD 502, which can be used to determine the voltage drop across the RTD 502. The determined voltage drop across the RTD 502 can be used with the known current from current source 530 to determine the resistance, and therefore the temperature, of the RTD 502. While not shown in the embodiment of FIG. 5, in some instances, the RTD 502 is a single RTD selected from an array of RTDs, for example, via the operation of a multiplexer and demultiplexer such as shown in FIG. 3.

Referring back to FIG. 1, a plurality of RTDs 102a-d can be disposed in the flow path of a process fluid in a fluid flow system. In some instances, the process fluid may include constituents that form deposits (e.g., scale, biofilm, etc.) on various fluid flow system components, such as the walls of the flow path 106, sensors, process instruments (e.g., a use device 105 toward which the process fluid flows), and the like. In some examples, deposits that form on the RTDs 102a-d in the fluid flow path can act as an insulating layer between the RTD and the process fluid, which can affect the thermal behavior of the RTDs.

Accordingly, in some examples, observing the thermal behavior of one or more RTDs in the fluid flow path can provide information regarding the level of deposit present at the RTDs (e.g., 102a-d). FIGS. 6A-6D illustrate exemplary thermal behavior of an RTD that can be used to characterize the level of deposit at the RTD.

Figure 6A:
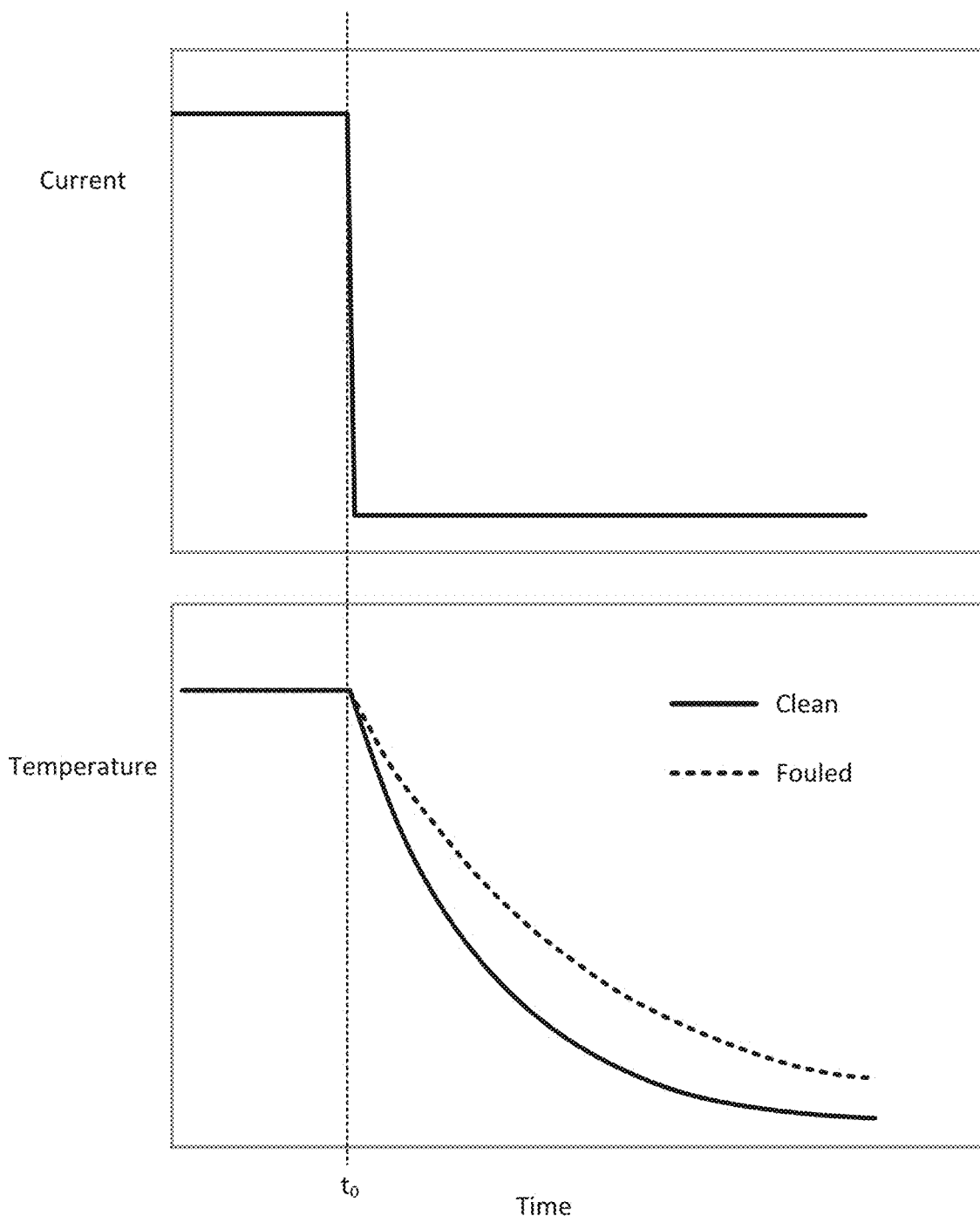
FIGS. 6A-6D illustrate exemplary thermal behavior of an RTD that can be used to characterize the level of deposit at the RTD.

FIG. 6A shows a plot of temperature and current vs time. In the illustrated example, a high current is applied to an RTD (e.g., a smoothed DC current applied to RTD 302a via channel A of the heating circuit 314 of FIG. 3). The applied current heats the RTD to an elevated temperature. At time $t_0$, the current is reduced, and the temperature of the RTD begins to decline. In some examples, the RTD is maintained at the elevated temperature for a duration of time. In other examples, the RTD is not necessarily maintained at an elevated temperature, but can be heated quickly with a current pulse and immediately allowed to cool. In general, any duration of current application can be used before the RTD is allowed to cool.

In the illustrated example, the temperature profile of both clean (solid line) and fouled (broken line) RTDs are shown. Though each RTD is heated to a high temperature (not necessarily the same temperature), the clean RTD cools more quickly than the fouled (coated) RTD, since the deposit on the fouled RTD provides thermal insulation between the RTD and the process fluid. In some embodiments, the temperature decay profile can be analyzed to determine the amount of deposit present on the RTD.

With reference to FIG. 2, the controller 212 can heat the RTD 202 via the heating circuit 214. In some examples, the controller 212 can periodically switch to measurement mode to measure the temperature of the RTD 202 via the measurement circuit 210. At time $t_0$, the controller 212 ceases applying power to the RTD 202 via the heating circuit 214 and switches to measurement mode to monitor the temperature of the RTD 202 via the measurement circuit 210 as the temperature decays due to the process fluid. The decay profile of the temperature of the RTD 202 can be monitored by the controller 212 via the measurement circuit 210. In some examples, the controller 212 is configured to analyze the temperature decay profile to determine the level of deposit on the RTD 202. For instance, the controller 212 can fit the decay profile to a function such as an exponential function having a time constant. In some such examples, the fitting parameters can be used to determine the level of deposit.

In an exemplary embodiment, the temperature decay profile over time can be fit to a double exponential function. For example, in some instances, a first portion of the double exponential decay model can represent temperature change due to the process fluid flowing through the flow system. A second portion of the double exponential decay model can represent temperature conductivity from a heated RTD to other components, such as wires, a sample holder (e.g., 104 in FIG. 1) or other components. In some such embodiments, the double exponential fitting functions can independently represent both sources of temperature conduction in the same function, and can be weighted to reflect the relative amount and timing of such temperature changes. In some such examples, a fitting parameter in the first portion of the double exponential decay model is representative of the level of deposit on the surface of an RTD interfacing with the fluid. Thus, in some such embodiments, the second portion of the exponential does not contribute to the characterized level of deposit. It will be appreciated that other fitting functions can be used in addition or alternatively to such a double exponential function.

In some cases, using certain fitting functions in characterizing the deposit can be skewed if the RTD is allowed to reach equilibrium with the process fluid, after which it stops changing in temperature. Accordingly, in various embodiments, the controller 212 is configured to resume heating the RTD prior to the RTD reaching thermal equilibrium and/or to stop associating collected temperature data with the thermal decay profile of the RTD prior to the RTD reaching equilibrium with the process fluid. Doing so prevents non-decay data from undesirably altering the analysis of the thermal decay profile of the RTD. In other embodiments, the fitting function can account for equilibration of the RTD temperature and the process fluid temperature without skewing the fitting function. In some such embodiment, the type of fitting function and/or weighting factors in the fitting function can be used to account for such temperature equilibration.

In some embodiments, the difference in decay profiles between clean and fouled RTDs can be used to determine the level of deposit on the fouled RTD. The decay profile of the clean RTD can be recalled from memory or determined from an RTD known to be free from deposit. In some instances, a fitting parameter such as a time constant can be temperature-independent. Thus, in some such embodiments, it is not necessary that the clean and fouled RTD are elevated to the same temperature for comparing aspects of their thermal decay profiles.

Figure 6B:
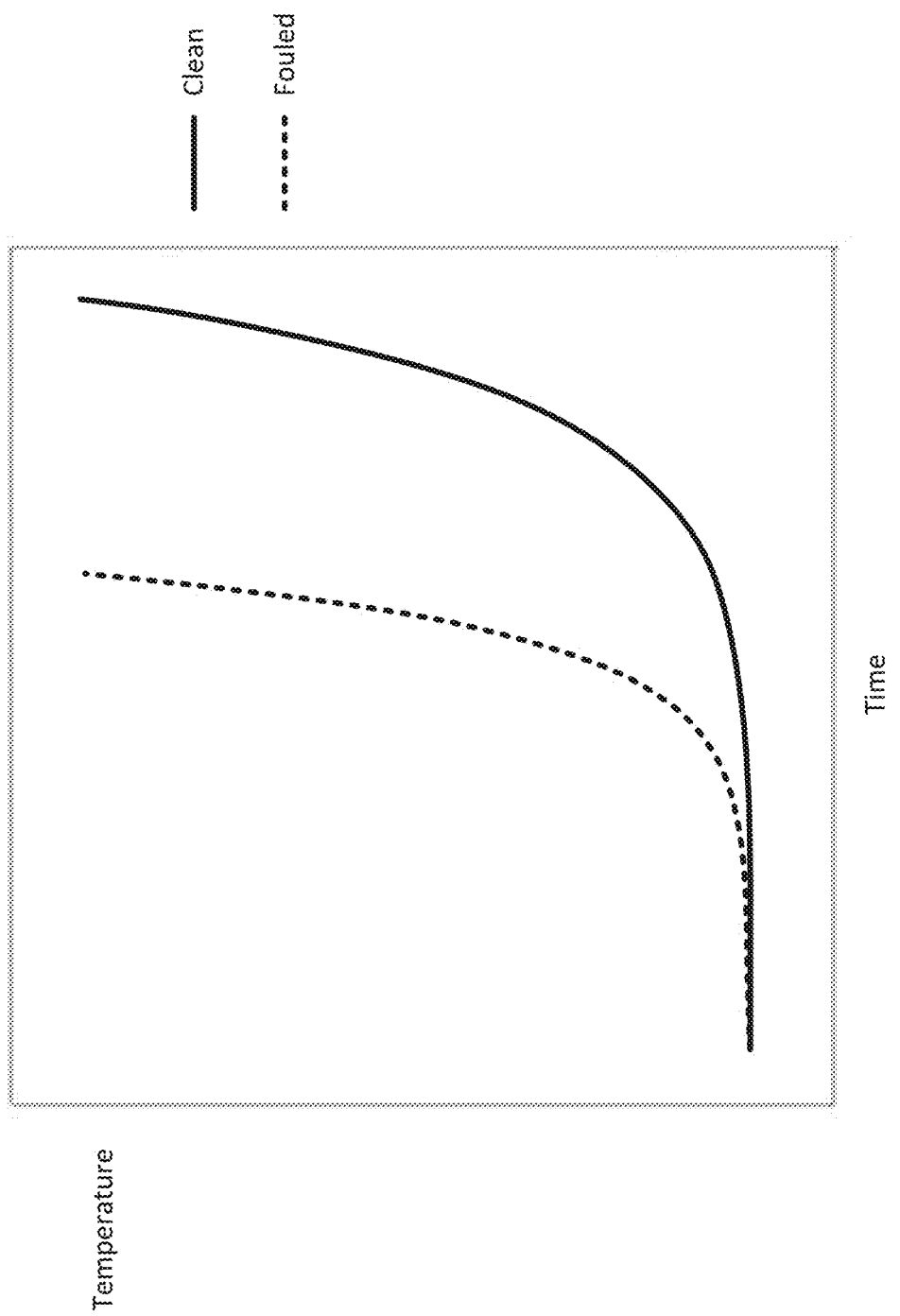

FIG. 6B shows a plot of temperature vs. time. In the illustrated example, an RTD is heated from a steady state condition (e.g., thermal equilibrium with the process fluid) while the temperature is monitored. As opposed to the temperature monitoring of FIG. 6A, in which the temperature can be continuously monitored since the temperature is decaying from an elevated temperature, monitoring the temperature of the RTD while increasing the temperature as in FIG. 6B requires heating of the RTD. Accordingly, in some embodiments, in order to achieve a plot such as that shown in FIG. 6B, the RTD can be rapidly switched from the heating mode to the measurement mode and back to the heating mode in order to achieve a nearly instantaneous temperature measurement while the temperature of the RTD does not significantly change due to the process fluid. In such a procedure, the temperature of the RTD can be elevated via the heating circuit and periodically sampled via the measurement circuit in order to determine a heating profile of the RTD over time.

Similar to FIG. 6A discussed above, the plot of FIG. 6B includes two curves—one representative of a clean RTD (solid line) and one representative of a fouled RTD (broken line). As shown, the fouled RTD increases in temperature much more quickly than the clean RTD, since the deposit on the fouled RTD insulates the RTD from the cooling effects of the process fluid. Thus, in some examples, the heating profile of the RTD can be used to determine a level of deposit on the RTD, for example, by fitting the heating profile to a function.

Figure 6C:
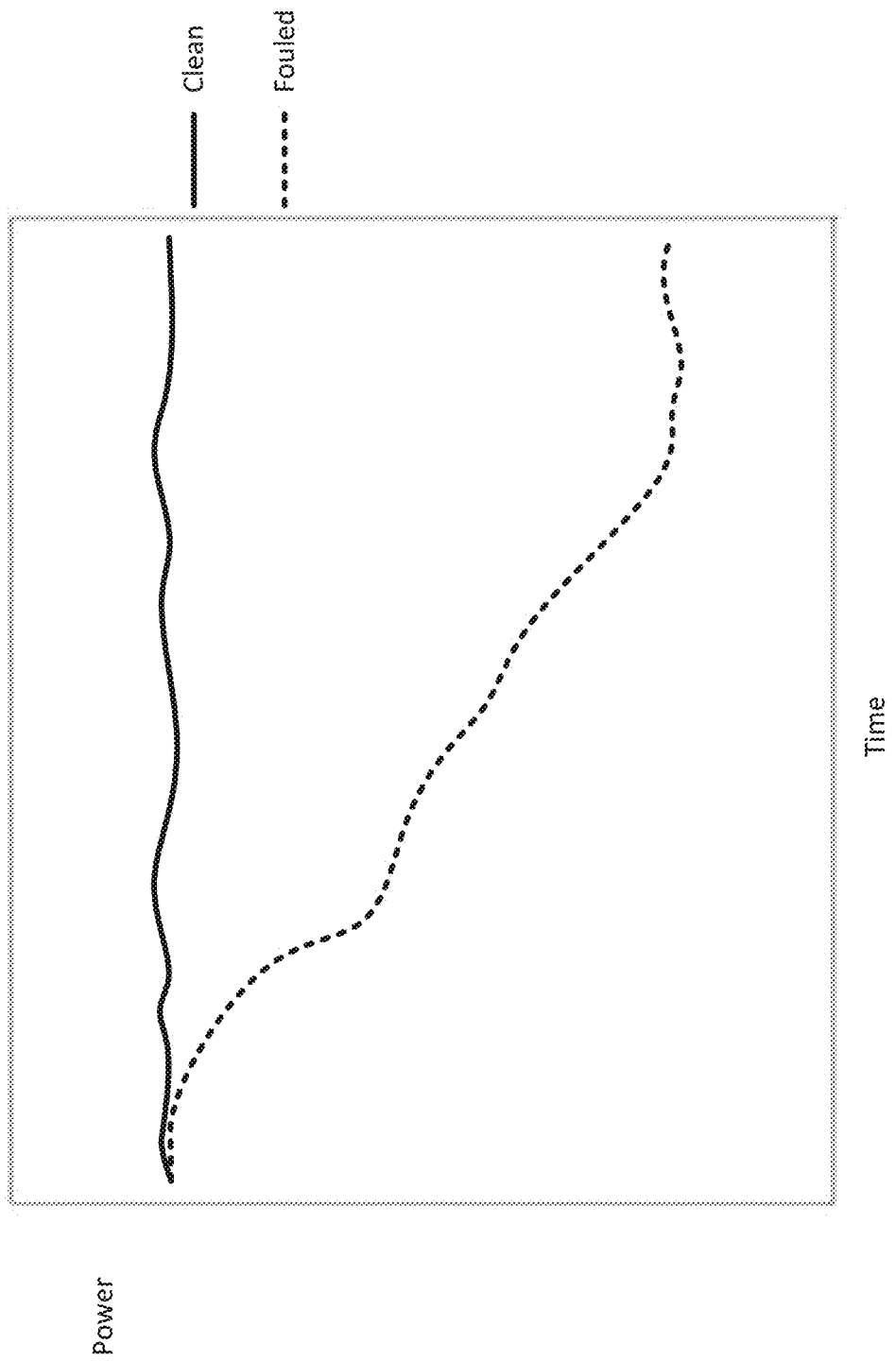

In some embodiments, rather than observing properties regarding RTD temperature change, an RTD can be raised to a fixed operating temperature. FIG. 6C shows a plot of the power required to maintain an RTD at a constant temperature over time. As shown, the power required to maintain a clean RTD (solid line) at a constant temperature remains relatively constant over time, as the RTD and process fluid reach an equilibrium condition. However, if deposits form on the RTD over time (as shown in the broken line representing a fouled RTD), the insulating properties of the deposit shield the RTD from the cooling effects of the process fluid. Thus, as the deposit forms over time, less power is required to be applied to the RTD in order to maintain a constant temperature.

With reference to FIG. 3, in some embodiments, the controller 312 is configured to heat an RTD (e.g., 302a) via the heating circuit 314. The controller 312 can periodically measure the temperature of the RTD (e.g., 302a) via the measurement circuit 310 as a way of providing feedback for the heating circuit 314 operation. That is, the controller 312 can determine the temperature of the RTD (e.g., 302a) via the measurement circuit and adjust the power applied to the RTD (e.g., 302a) via the heating circuit 314 accordingly to achieve and maintain a desired temperature at the RTD. In some such embodiments, the controller switches between the heating mode to the measurement mode and back rapidly so that the temperature of the RTD does not significantly change while measuring the temperature. In various examples, the controller 312 can determine how much power is being applied to the RTD (e.g., 302a), for example, via a magnitude, duty cycle, or other parameter applied from one or more components of the heating circuit 314 (e.g., the PWM module 316 and/or the amplification stage 318) controlled by the controller 312.

In some examples, the amount of power required to maintain the RTD at a fixed temperature is compared to the power required to maintain a clean RTD at the fixed temperature. The comparison can be used to determine the level of deposit on the RTD. Additionally or alternatively, the profile of the required power to maintain the RTD at the fixed temperature over time can be used to determine the level of deposit on the RTD. For instance, the rate of change in the power required to maintain the RTD at the fixed temperature can be indicative of the rate of deposition of the deposit, which can be used to determine the level of a deposit after a certain amount of time.

In another embodiment, an RTD can be operated in the heating mode by applying a constant amount of power to the RTD via the heating circuit and observing the resulting temperature of the RTD. For instance, during exemplary operation, the controller can provide a constant power to an RTD via the heating circuit and periodically measure the temperature of the RTD via the measurement circuit. The switching from the heating mode (applying constant power) to the measurement mode (to measure the temperature) and back to the heating mode (applying constant power) can be performed rapidly so that the temperature of the RTD does not significantly change during the temperature measurement.

Figure 6D:
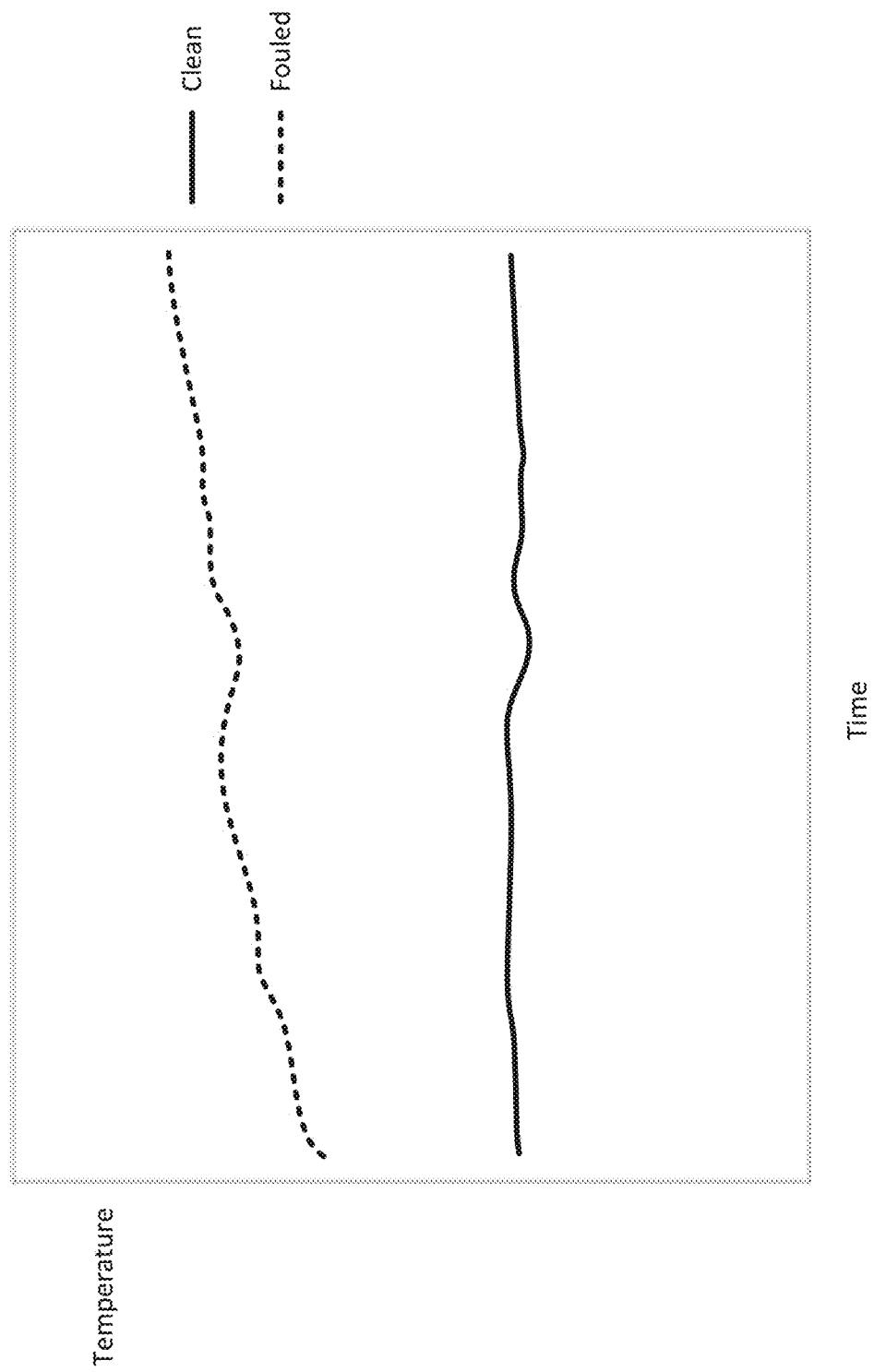

FIG. 6D is a plot of temperature vs time of an RTD to which a constant power is applied via a heating circuit. In the event of a clean RTD (solid line), the resulting temperature from the applied constant power is approximately constant over time. However, the temperature of a fouled RTD (broken line) increases over time. As described elsewhere herein, as deposits form on the RTD, the deposits insulate the RTD from the cooling effects of the process fluid. In general, a thicker deposit will result in greater insulating properties, and thus a greater temperature achieved by applying the same power to the RTD.

In some embodiments, the difference in temperature between a clean RTD and an RTD under test when a constant power is applied to each can be used to determine the level of deposit on the RTD under test. Additionally or alternatively, the rate of temperature increase based on a constant applied power can provide information regarding the rate of deposition of a deposit on an RTD, which can be used to determine a level of deposit on the RTD.

With reference to FIGS. 6A-6D, various processes have been described for characterizing a deposit on an RTD. Such processes generally involve heating the RTD via a heating circuit and measuring a temperature of the RTD via a measurement circuit. Changes in the thermal behavior of the RTD (e.g., temperature increase or decay profile, the applied power required to reach a predetermined temperature, the temperature achieved at a predetermined applied power) provide evidence of a deposit forming on the RTD. In some examples, such changes can be used to determine a level of deposit on the RTD.

In various embodiments, a controller can be configured to interface with a heating circuit and a measurement circuit in order to perform one or more of such processes to observe or detect any deposition from a process fluid onto an RTD. In an exemplary implementation with reference to FIGS. 1 and 2, an RTD (e.g., 102a) can be elevated to the operating temperature of a use device 105 via a heating circuit (e.g., 214). Since the deposition of constituents of a process fluid is often temperature dependent, elevating the temperature of the RTD to the operating temperature of the use device can simulate the surface of the use device at the RTD. Accordingly, deposits detected at the RTD can be used to estimate deposits at the use device.

In some examples, the use device becomes less functional when deposits are present. For instance, in a heat exchanger system wherein the use device comprises a heat exchange surface, deposits formed on the heat exchange surface can negatively impact the ability for the heat exchange surface to transfer heat. Accordingly, sufficient depots detected at the RTD can alert a system operator of likely deposits at the heat exchange surface, and corrective action can be taken (e.g., cleaning the heat exchange surface). However, even if the RTD simulating the use device allows a system operator to detect the presence of a deposit at the use device, addressing the detected deposit (e.g., cleaning, etc.) can require costly system downtime and maintenance since the deposition has already occurred. Additionally or alternatively, in some instances, various deposits may not clean well even if removed for a cleaning process, possibly rendering the use device less effective.

Accordingly, in some embodiments, a plurality of RTDs (e.g., 102a-d) can be disposed in a single fluid flow path (e.g., 106) and used to characterize the status of the process fluid and/or the fluid flow system (e.g., 100). With reference to FIG. 1, in an exemplary implementation, use device 105 of the fluid flow system 100 typically operates at operating temperature $T_O$. RTDs 102a-d can be elevated to temperatures more likely to drive deposition of a deposit from the process fluid than $T_O$. For example, various process fluids can include constituents such as calcium and/or magnesium sulfates, carbonates, and/or silicates, and/or other components that can be deposited from the process fluid. Some such process fluids are more prone to produce deposits on higher temperature surfaces when compared to lower temperatures. In some such examples, one or more of the plurality of RTDs 102a-d are elevated to a temperature higher than the typical operating temperature of the use device 105 in order to induce deposits onto the RTDs and to characterize the deposits forming on the RTDs. This also can represent a "worst case" for use device 105 operation when deposit formation is more likely than usual, such as at an unusually high temperature.

For example, with reference to FIG. 3, in an exemplary embodiment, each of RTDs 302a-d is heated to a different elevated characterization temperature via channels A-D, respectively, of the heating circuit 314. In the exemplary embodiment, the characterization temperature of each of the RTDs 302a-d is above a typical operating temperature of a use device of the fluid flow system. In some such examples, the controller 312 controls the heating circuit 314 to maintain the RTDs 302a-d at their respective elevated characterization temperatures. The controller 312 can periodically switch to operate RTDs 302a-d in a measurement mode via the measurement circuit 310 (e.g., using multiplexer 320 and demultiplexer 322 and current sources 330, 332) to ensure the RTDs 302a-d are elevated to the desired characterization temperature.

During operation, after maintaining the RTDs 302a-d at their respective characterization temperatures, the controller 312 can be configured to perform a deposit characterization process such as those described above with respect to any of FIGS. 6A-D. For example, the controller 312 can, after operating an RTD in the heating mode to maintain an elevated temperature, periodically switch between the heating mode and measurement mode and observe changes in the thermal behavior of the RTD. As described with respect to FIGS. 6A-D, periodically switching between the heating mode and the measurement mode can be performed in a variety of ways.

For example, such switching can include switching to a measurement mode for a period of time to observe the temperature decay of the RTD (e.g., as in FIG. 6A) before heating again. Changes in the thermal behavior of the RTD can include a change in time constant demonstrated by the temperature decay. Alternatively, periodically switching between the heating mode and the measurement mode can include increasing the temperature of the RTD while rapidly switching to the measurement mode to sample the temperature of the RTD and back to the heating mode to continue heating (e.g., as in FIG. 6B). Similarly, changes in the thermal behavior of the RTD can include changes in a time constant demonstrated in the temperature increase profile.

In still another example, periodically switching between the heating mode and the measurement mode can include heating the RTD to maintain the RTD at a constant temperature while periodically switching to the measurement mode to confirm the constant temperature is maintained (e.g., as illustrated in FIG. 6C). In such an embodiment, changes in thermal behavior of the RTD can include changes in the amount of power applied by the heating circuit to maintain the temperature of the RTD at the constant temperature. Alternatively, periodically switching between the heating mode and the measurement mode can include heating the RTD using a constant applied power while periodically sampling the temperature of the RTD in the measurement mode (e.g., as illustrated in FIG. 6D). In such an embodiment, changes in the thermal behavior of the RTD can include changes in the temperature achieved by the RTD due to the constant applied amount of power.

As discussed elsewhere herein, observing such changes in the thermal behavior of an RTD can be indicative of, and used to determine, a level of deposit on the RTD. Thus, in some examples, the controller 312 can perform any of such processes on the plurality of RTDs 302a-d that have been elevated to different temperatures to characterize the level of deposit on each of the RTDs 302a-d. In some such examples, the controller 312 characterizes the deposit level at each of the RTDs 302a-d individually via corresponding channels A-D in the multiplexer 320 and demultiplexer 322.

The controller 312 can be configured to associate the level of deposit of each RTD with its corresponding characterization temperature. That is, the controller 312 can determine a level of deposit at each of the RTDs 302a-d and associate the level of deposit with the initial characterization temperature of each of the respective RTDs 302a-d. The associated deposit levels and operating temperatures can be used to characterize a temperature dependence of deposition on surfaces in the fluid flow system. If the typical operating temperature of the use device (e.g., a heat exchanger surface) is lower than the characterization temperatures of the RTDs 302a-d, and deposits are driven by increased temperature, the use device will tend to have less deposit than the RTDs 302a-d. Moreover, the temperature dependence of deposition characterized by the RTD operation can be used to infer the likelihood of deposits forming on the use device.

Additionally or alternatively, periodically observing the depositions on the various RTDs operating at different characterization temperatures can provide information regarding general increases or decreases in the occurrence of depositions. Such changes in deposition characteristics of the process fluid can be due to a variety of factors affecting the fluid flow system, such as a change in the temperature or concentration of constituents in the process fluid.

In an exemplary operation, an increase in deposition and/or deposition rate detected from the characterization RTDs can be indicative of a deposit condition for the use device, in which deposits forming on the use device during normal operation become more likely. The detection of a deposit condition can initiate subsequent analysis to determine the cause of increased deposition, such as measuring one or more parameters of the process fluid. In some instances, this can be performed automatically, for example, by the controller.

Additionally or alternatively, one or more parameters of the process fluid can be adjusted to reduce the deposits deposited from the process fluid into the fluid flow system and/or to eliminate the deposits that have already accumulated. For instance, a detected increase in deposition can cause an acid or other cleaning chemical to be released to attempt to remove the deposit. Similarly, in some examples, a chemical such as an acid, a scale inhibitor chemical, a scale dispersant, a biocide (e.g., bleach), or the like can be added to the process fluid to reduce the likelihood of further deposition.

In some examples, an increase in deposition (e.g., scale) over time can be due to the absence of or reduction in a typical process fluid constituent (e.g., a scale inhibitor and/or a scale dispersant), for example, due to equipment malfunction or depletion of a chemical. Reintroducing the constituent into the process fluid can act to reduce the amount of deposition from the process fluid into the fluid flow system. Additionally or alternatively, various fluid properties that can impact the likelihood of deposit formation can be measured via one or more sensors (e.g., 111) in the fluid flow system, such as fluid operating temperature, pH, alkalinity, and the like. Adjusting such factors can help to reduce the amount and/or likelihood of deposition.

In various embodiments, any number of steps can be taken in response to address an increase in detected deposition or other observed deposition trends. In some embodiments, the controller is configured to alert a user of changes or trends in deposits. For example, in various embodiments, the controller can alert a user if deposit rates, levels, and/or changes therein meet a certain criteria. In some such examples, criteria can be temperature dependent (e.g., a deposit level or rate occurring at an RTD with a certain characterization temperature) or temperature independent. Additionally or alternatively, the controller can alert a user if determined properties of the process fluid satisfy certain criteria, such as too low or too high of a concentration of a fluid constituent (e.g., that increase or decrease likelihood of deposits) and/or various fluid properties that may impact the amount and/or likelihood of deposition.

In some such examples, alerting the user is performed when the system is potentially trending toward an environment in which deposits may being to form on the use device so that corrective and/or preventative action can be taken before significant deposits form on the use device. In some examples, an alert to a user can include additional information, such as information regarding properties of the process fluid flowing through the system, to better help the user take appropriate action. Additionally or alternatively, in some embodiments, the controller can be configured to interface with other equipment (e.g., pumps, valves, etc.) in order to perform such action automatically.

In some systems, certain deposits become more likely as the deposit surface temperature increases. Thus, in some embodiments, RTDs (e.g., 302a-d) can be heated to temperatures above the typical operating temperatures of a use device in order to intentionally induce and monitor deposits from the process fluid can help to determine situations in which the use device is at risk for undesired deposits. In some such embodiments, observing deposition characteristics on one or more RTDs that are operating at a temperature higher than a typical temperature of the use device can be used to determine deposition trends or events at certain surface temperature while minimizing the risk of actual deposition on the use device. In some instances, elevating different RTDs to different temperature provides the controller with information regarding the temperature dependence of deposit formation in the fluid flow system, and can be further used to characterize deposit formation in the fluid flow system.

After repeated or prolonged characterization in which the RTDs are heated to induce deposits, the RTDs may eventually become too coated for effective characterization. In some such embodiments, the plurality of RTDs (e.g., 102a-d) can be removed from the system and cleaned or replaced without disrupting operation of the system or use device. For example, with reference to FIG. 1, the RTDs 102a-d can be mounted to a sample holder 104 that is easily removable from the system 100 for servicing the RTDs 102a-d. Thus, in some embodiments, cleaning or replacing the characterization RTDs can be performed with much lower cost and less downtime than having to service the use device itself.

In some examples, the likelihood of deposits forming within a fluid flow system can be considered a deposit potential of the system. In various embodiments, the deposit potential can be a function of surface temperature of an object within the fluid flow system. In other examples, the deposit potential may be associated with a particular use device within the system. In some systems, the deposit potential can be used as a metric for observing the absolute likelihood of deposits forming within the system. Additionally or alternatively, the deposit potential can be used as a metric for observing change in the deposit conditions within the fluid flow system. In some such examples, the absolute deposit potential need not necessarily correspond to a deposit condition, but changes in the deposit potential may be indicative of increased likelihood of a deposit condition, for example.

Figure 7:
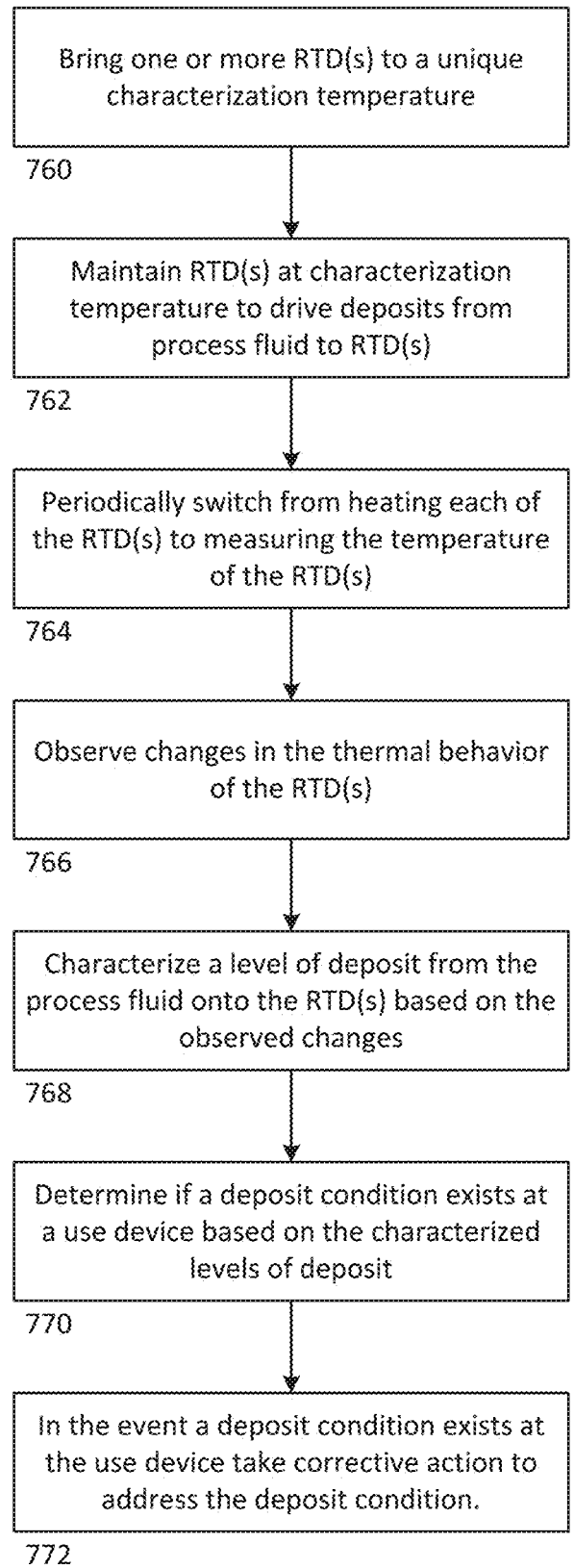
FIG. 7 is a process-flow diagram illustrating an exemplary process for mitigating deposits from a process fluid onto a use device in a fluid flow system.

FIG. 7 is a process-flow diagram illustrating an exemplary process for assessing the deposit potential of a process fluid onto a use device in a fluid flow system. The method includes bringing one or more RTD(s) to a unique characterization temperature (760) and maintaining the RTD(s) at the characterization temperatures to drive deposits from the process fluid onto the RTD(s) (762). This can be performed, for example, by operating the RTD(s) in a heating mode using a heating circuit as described elsewhere herein. In some examples, at least one of the characterization temperatures is higher than an operating temperature of the use device. It will be appreciated that, bringing one or more RTD(s) to a characterization temperature can include operating one or more RTD(s) in thermal equilibrium with the process fluid flowing through the fluid flow system. That is, the characterization temperature for one or more RTDs can be approximately the same temperature as the process fluid flowing through the fluid flow system.

The method further includes periodically switching the RTD(s) from the heating mode to a measurement mode to measure the temperature of the RTD(s) (764) and observing changes in the thermal behavior of the RTD(s) (766). This can include, for example, processes as described with respect to FIGS. 6A-D. The observed changes can be used to characterize a level of deposit from the process fluid onto each of the one or more RTD(s) (768). This can include, for example, determining a time constant for a fitting function of measured temperature decay and observing changes to the time constant at different measurement times. Changes in the time constant can be representative of deposits forming on the RTD and altering the thermal behavior of the RTD. In some examples, characterizing the level of deposit can include comparing decay profiles for RTDs operating at difference characterization temperatures (e.g., a heated RTD and an unheated RTD).

In addition to a deposit thickness, additional characterization of the levels of deposit can include determining a likely deposited material in the system. Comparing the thermal decay profiles for heated and unheated or only slightly heated RTDs, the nature of the deposit can be determined. For example, in some cases, sedimentation and/or biofilm (e.g., microbial growth) deposits are generally unaffected by the surface temperature, while scaling effects will be enhanced at higher temperatures. Thus, the characterization temperature dependence of the thermal decay profiles can be used to characterize the type of deposits present at the RTDs and within the fluid flow system.

The method can further include determining if a deposit condition exists at the use device. This can include, for example, monitoring the deposition levels and/or rates at the plurality of RTD(s) over time to observe deposition trends. In some examples, certain rates of deposition or increases in rates of deposition can indicate a deposit condition in which deposits forming on the use device become more likely. In some such examples, levels of deposit, rates of deposit, and/or changes therein at an RTD can be analyzed in combination with its associated characterization temperature to determine if a deposit condition exists. Additionally or alternatively, analyzing the relationship of such data (e.g., levels of deposit, rates of deposit, and/or changes therein) with respect to temperature (e.g., at RTD(s) having difference characterization temperatures) can be used to detect a deposit condition.

In some examples, monitored deposit levels, deposit rates, and/or other data such as fluid properties (e.g., temperature, constituent concentrations, pH, etc.) can be used to determine a deposit potential of the process fluid on to the use device. In various embodiments, the deposit potential meeting a predetermined threshold and/or changing by a predetermined amount can be used to detect the presence of a deposit condition.

In the event of a deposit condition, the method can include taking corrective action to address the deposit condition (e.g., step 772). The corrective action can include a variety of actions, such as introducing or changing the dose of one or more chemicals in the process fluid, changing the temperature of the process fluid, alerting a user, adjusting the use device for the process fluid (e.g., a heat load on a heat exchanger), increasing a rate of blowdown, and/or other actions that can affect the deposition characteristics of the process fluid. In an exemplary embodiment, deposition characterization can include determining the likely deposited material, such as scale, biofilm, or the like.

In some such embodiments, the corrective action (e.g., 772) can be specifically taken to address the determined deposit material. For instance, a scale inhibitor can be added or increased due to a detected scaling event. However, if the deposition characterization is representative of a biofilm rather than scale, a biocide can be added or increased. Such corrective actions can be performed automatically by the system. Additionally or alternatively, the system can signal to a user to take corrective action to address the deposit condition.

In some embodiments in which the fluid flow system can receive fluid from a plurality of fluid sources (e.g., selectable input sources), the corrective action can include changing the source of fluid input into the system. For instance, in an exemplary embodiment, a fluid flow system can selectively receive an input fluid from a fresh water source and from an effluent stream from another process. The system can initially operate by receiving process fluid from the effluent stream. However, in the event of a detected or potential deposit condition, the source of fluid can be switched to the fresh water source to reduce the possible deposit materials present in the process fluid. Switching the source of fluid can include completely ceasing the flow of fluid from one source and starting the flow of fluid from a different source. Additionally or alternatively, switching sources can include a mixture of the original source (e.g., the effluent stream) and the new source(s) (e.g., the fresh water). For example, in some embodiments, a desired blend of fluid from different input sources (e.g., 50% from one source and 50% from another source) can be selected.

In a similar implementation, in some embodiments, the corrective action can include temporarily stopping flow from a single source (e.g., an effluent source) and providing a process fluid from a different source (e.g., fresh water). The new source of fluid can be used temporarily to flush potential deposit materials from the system before excessive deposit can occur. In some examples, once such materials have been flushed from the system (e.g., via fresh water), the source of the process fluid can be switched back to the original source (e.g., the effluent stream). In some examples, flushing the fluid from the system can be done while operating the use device in the system. In other examples, when certain deposit conditions and/or likelihoods are detected (e.g., a certain deposit potential is reached), flow to the use device can be stopped and the fluid in the system can be directed to a drain to rid the system of such fluid. The system can then direct fluid back to the use device from either fluid source or a combination thereof.

In still another implementation, as described elsewhere herein, a default input fluid can be the combined flow of fluid from each of a plurality of available sources. In the event of detected deposit conditions, one or more of the fluid sources can be closed off from the system (e.g., via a shutoff valve). In some examples, systems can include one or more auxiliary sensors configured to monitor one or more parameters of the fluid flowing into the system from each input source, such as a conductivity sensor, concentration sensor, turbidity sensor, or the like. Data from such auxiliary sensors can be used to determine which of the input sources is/are contributing to the deposit condition. Such fluid sources can then be prevented from contributing to the fluid flowing through the system.

Blocking, switching between, and/or combining process fluid input sources can be performed, for example, via one or more valves arranged between the source(s) and the fluid flow system. In various embodiments, the valves can be manually and/or automatically controlled to adjust the source(s) of the input fluid. For example, in some embodiments, a detected deposit condition can cause a controller in communication with one or more such valves to actuate such valves to adjust the source of fluid flowing into the system. Alternatively, the controller can indicate to the user that corrective action should be performed, and the user can actuate such valves to adjust the source of fluid to the system.

As described elsewhere herein, one or more fluid input sources can include one or more RTDs disposed therein. Such RTD(s) can be used to characterize deposit conditions for each of the plurality of fluid sources individually. Accordingly, if one fluid source is exhibiting a deposit condition, one or more corrective actions can include performing an action to affect the fluid flowing into the system from that source (e.g., adjusting a parameter of the fluid) and/or blocking the fluid from flowing into the system (e.g., via a valve). In some examples, each input fluid source includes one or more such RTDs so that each source can be characterized individually. In some such embodiments, one or more RTDs can additionally be positioned in the fluid flow path after fluid from each of the fluid sources are combined so that the composite fluid can also be characterized separately from each of the individual sources.

In general, taking one or more corrective actions (e.g., step 772) can act to reduce the rate of deposition at the use device. Thus, in some such embodiments, the corrective action acts as a preventative action for preventing undesirable deposits from forming on the use device. This can prolong the operability of the use device while minimizing or eliminating the need to shut down the system in order to clean deposits from the use device.

In some embodiments the taken and/or suggested corrective action can be based on data received from one or more additional sensors (e.g., 111). For instance, in some embodiments, reduction in a scale inhibitor (e.g., detected via a scale inhibitor introduction flow rate meter and/or a scale inhibitor concentration meter) contributes to a deposit condition in the system. Thus, the corrective action can include replenishing a supply of scale inhibitor. Similarly, in some examples, the presence of excess deposit material (e.g., calcium detected by a concentration meter) contributes to a deposit condition. Corresponding corrective action can include introducing or increasing the amount of a scale inhibitor into the system. Additionally or alternatively, a corrective action can include changing phosphate levels in the fluid. For example, phosphate deposits accumulating in the system can result in reducing the flow of a phosphorus-containing chemical or phosphate deposition catalyst. In other examples, the addition of phosphate-containing fluids may inhibit other deposits from forming. In some such examples, such phosphate- or phosphorus-containing fluids can be added or increased.

Appropriate corrective actions can be determined, in some embodiments, based on the characterized levels of deposits (e.g., at step 768). For example, greater deposition rates and/or deposit potentials can result in greater amounts of scale inhibitor to be released into the system to prevent deposits from forming. Additionally or alternatively, characterizations in the type of deposits forming (e.g., by comparing thermal decay profiles at different temperatures) can influence which corrective actions are taken. For example, if characterization of the deposit levels indicates that the deposits are generally sedimentation rather than scaling, releasing scale inhibitor chemicals may not be a useful action, and other, more appropriate action may be taken.

In some embodiments, a plurality of RTDs can have different surface characteristics to help identify a type of deposit forming on the RTD. For example, a surface of an RTD facing fluid flowing through the system can be coated with a material having one or more characteristics that can provide an indication of the types of deposit forming on the surface. In various embodiments, such a coating can act to encourage one or more types of deposit from forming, discourage one or more types of deposit from formatting, or encourage one or more types of deposit from forming and discourage one or more different types of deposit from forming. Observing the behavior of a particular RTD having a particular surface characteristic can be used to gain information regarding the deposits forming at the RTD. In some examples, comparing the behavior of an RTD with a particular surface characteristic with that of an RTD not having the surface characteristic can provide additional information regarding potential system deposits.

In some examples, determining a type of deposit forming on a surface can be used to determine one or more properties of the fluid flowing through a system and contacting the RTDs. In addition, other surface interactions, such as corrosion or swelling, can similarly modify thermal properties of the RTD and can be detected and analyzed via characterizations described herein.

In some examples, functionalized surfaces of RTDs can be used as a quantitative sensor for analyzing specific components of a fluid stream. For example, in some cases, monitoring the heat transfer characteristics of RTDs or other thermoelectric devices as described herein in combination with functionalized RTD surfaces can be used to determine or otherwise develop a signal related to change on the surface of the device that may indicate a number of phenomena, such as fluid propensity to form deposits, characterization of fluid composition, and characterization of the corrosivity or other fluid characteristics. Changes in thermal characteristics of the RTD (e.g., thermal decay time constants) can indicate changes to the surface of an RTD (e.g., due to deposit formation, corrosion of a surface, etc.). The changes in the thermal characteristics can be analyzed to characterize surface changes, which can be used to determine properties of the fluid flowing past the RTD. Such analysis of the fluid can be used to select one or more appropriate corrective actions, the timing of such corrective action(s), and/or the amplitude of such corrective action(s) to achieve a desired result in the fluid. Such analysis can also be used to monitor the result of the corrective actions.

Figure 8:
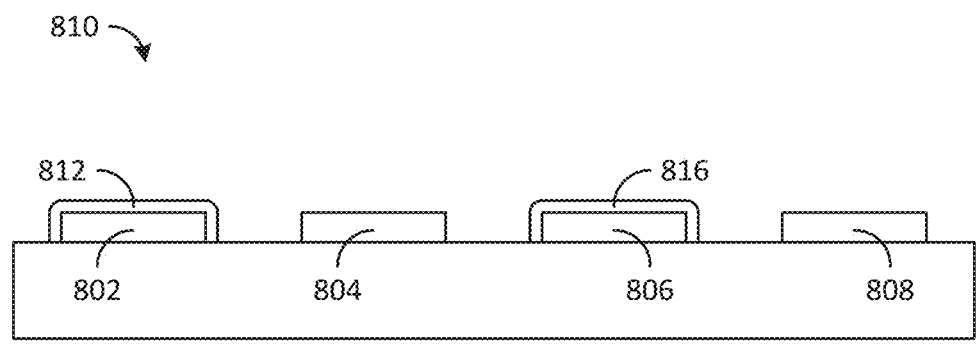
FIG. 8 shows an example illustration of a plurality of RTDs wherein some of the RTDs are coated with a surface coating.

FIG. 8 shows an example illustration of a plurality of RTDs wherein some of the RTDs are coated with a surface coating. As shown in FIG. 8, a plurality of RTDs 802, 804, 806, 808 are supported by a holder 810. Holder 810 can be positioned in a fluid flow system so that a fluid flows across the surface of RTDs 802, 804, 806, 808, similar to holder 104 positioned in fluid flow system 100 shown in FIG. 1. While RTDs 802, 804, 806, 808 are shown as protruding from the surface of the holder 810 in FIG. 8, in various embodiment, RTDs can be flush with the surface of the holder 810 or recessed from the surface of the holder 810. Various configurations are possible.

In the illustrated example, the surface of RTD 802 is coated with coating 812 and RTD 806 is coated with coating 816. RTDs 804 and 808 do not have a particular coating. In some embodiments, uncoated RTDs include a conductive element (e.g., platinum) coated in a protective material, such as alumina. In some such cases, coated RTDs include additional coatings (e.g., 812, 816) coating the protective material. In general, any number of RTDs can be included, and any subset of such RTDs can be coated with a coating. In various examples, different RTDs can be coated with the same or different coatings have similar or different surface characteristics.

In an example embodiment, coating 816 on RTD 806 can include an antimicrobial material that prevents or otherwise inhibits biofilm deposits from forming on the coated RTD, such as silver, oligon, platinum, chlorhexidine-silver sulphadiazine (CHSS), and minocycline-rifampicin (MR). During operation, RTD 806 with antimicrobial coating 816 and uncoated RTD 808 can be operated and characterized according to any of a variety of methods described herein in order to determine a level of deposit forming on the RTD/coating surface. For example, RTDs 806 and 808 can be heated to the same temperature (e.g., via an electrical current) and allowed to cool due to the fluid flowing across the surfaces of the RTDs. The temperature decay of each RTD over time can be measured, such as shown in FIG. 6A.

In various examples, heating the RTDs can include operating the RTD at an elevated temperature for a period of time before allowing the temperature to fall to an equilibrium temperature. In other examples, heating the RTD comprises temporarily heating the RTD to an elevated temperature (e.g., for a predetermined amount of time or to a predetermined temperature) before allowing the temperature to fall to an equilibrium temperature to characterize the temperature decay.

In some such embodiments, if deposition occurs on both coated RTD 806 and uncoated RTD 808 approximately equally, the likely source of deposit is unaffected by antimicrobial coating 816, and is likely inanimate. However, if the temperature decay profile of uncoated RTD 808 indicates that a deposit has formed on the RTD 808 and the temperature decay profile of RTD 806 having antimicrobial coating 816 suggests less or no deposits when compared to that of uncoated RTD 808, then the properties of the coating 816 likely impact the deposits forming on the RTD. Moreover, if coating 816 comprises an antimicrobial material, it is likely that the source of deposits detected on the uncoated RTD 808 is microbial.

Such a process identifying the type of deposits forming in a system and/or present in the fluid flowing past the holder 810 and RTDs 802, 804, 806, 808 can be used to trigger a corrective action appropriate for the identified deposit. For example, in the above example, detecting a biofilm within the system and/or fluid based on comparisons of deposits on antimicrobial coating 816 and on uncoated RTD 808 can trigger the release of a biocide or other action.

Figure 9:
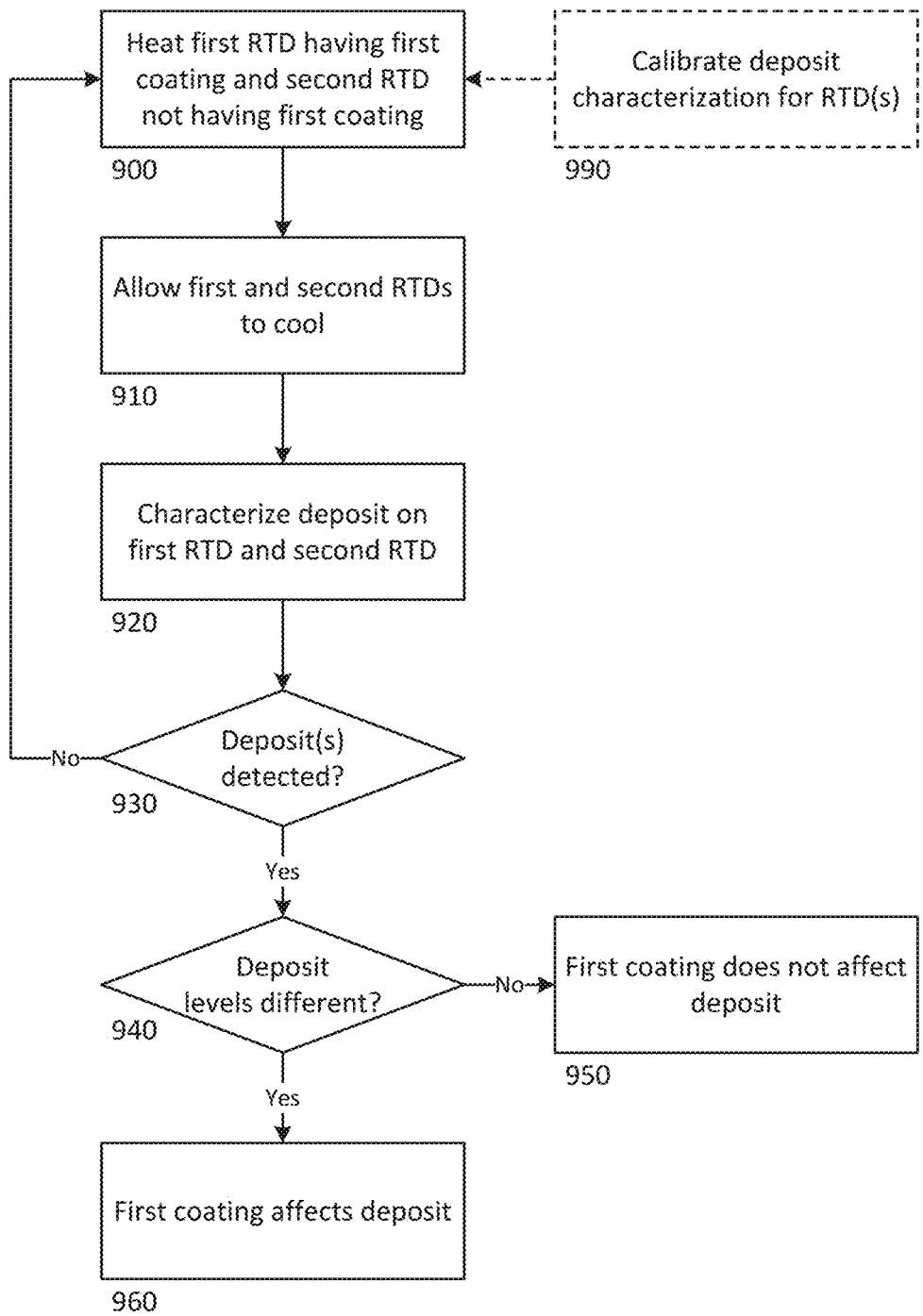
FIG. 9 is a process flow diagram showing an example process for detecting and addressing biofilm deposits using first RTD having a first coating and a second RTD not having the first coating.

FIG. 9 is a process flow diagram showing an example process for detecting and addressing biofilm deposits using first RTD having a first coating and a second RTD not having the first coating. The method of FIG. 9 includes heating a first RTD having a first coating (e.g., an antimicrobial coating) and a second RTD not having the first coating (e.g., not having the antimicrobial coating of first RTD) (900). In some examples, the second RTD can include no coating, such as RTD 808 in FIG. 8. In other examples, the second RTD can include a coating that is different from the first coating on the first RTD.

The method includes allowing the first and second RTDs to cool (910) and characterizing deposit(s) on the first and second RTDs (920). As described elsewhere herein, characterizing the deposit can include, for example, observing a temperature decay profile over time to determine a level of deposit contributing the rate of temperature change of the RTD (e.g., by fitting the decay profile to a function, such as an exponential function).

Upon characterizing potential deposits on the first and second RTDs, the method includes determining whether deposit(s) is/are detected on the RTDs (930) based on the characterizations. If no deposits are detected, the process can be ended and/or repeated, either immediately or at a later time. However, if deposit(s) is/are detected, the method includes determining whether or not the deposit levels are different (940).

If the deposit levels are different between the first and second RTD, it can be determined that the first coating affects the deposit on the RTD (960). However, if the deposit levels are not different between the first and second RTD, it can be determined that the first coating does not impact the deposit on the RTD. For example, if the first coating is antimicrobial, the second RTD does not have an antimicrobial property, and deposit levels on first and second RTDs are approximately equal, the deposit is likely not biological. On the other hand, if deposit levels are unequal, then the deposit likely is biological.

While examples used above are generally described with respect to antimicrobial coatings and biofilm detection, various other implementations are possible. For instance, in some examples, coating(s) on RTD(s) can be customized to preferentially receive or inhibit particular types of deposits. Coatings designed to receive only a particular type of deposit can be used to detect the presence of the desired deposit compared to other deposits in the system.

In an example implementation, with respect to FIG. 8, coating 812 on RTD 802 can be designed so as to only receive or preferentially receive certain types of deposits. For example, coating 812 can include a molecular imprinted polymer designed to preferentially receive only a particular molecule on the surface thereof. The process of FIG. 9 can be executed using a configuration in which the first coating comprises the molecular imprinted polymer coating, and whether or not any detected deposit levels are different (940), the difference may be attributed to deposition of materials other than the target molecule on the RTD not coated in the molecular imprinted polymer coating. Additionally or alternatively, any detected deposit on the RTD coated in the molecular imprinted polymer coating could be used to indicate that the target molecule is being deposited in the system.

As described elsewhere herein, deposits formed on RTDs can generally impact the thermal behavior of such RTDs due to a possible insulating property of the deposit. In some examples, one or more coatings (e.g., 812, 816) can insulate RTDs (e.g., 802, 806, respectively) an impact the thermal behavior thereof. Accordingly, in some examples, RTDs can be calibrated (990) to account for the impact of coatings on thermal behavior of the RTDs so that a comparison of the thermal behavior of RTDs (e.g., RTD 806 with coating 816 and uncoated RTD 808) is not skewed by differences in the RTD design.

In some examples, coatings (e.g., 812, 816) on one or more RTDs can be thin enough to have little or no impact on the thermal characteristics of the RTD itself. For example, in some embodiments, an RTD coating will be sufficiently thin so that the temperature profile (e.g., heating profile during a heating mode of operation, temperature decay profile after being heated) of the coated RTD will be approximately the same as that of an uncoated RTD. In some examples, such RTDs can be calibrated to compensate for even small thermal impacts of the coating. In other examples, the coated RTDs are not calibrated.

Figure 10:
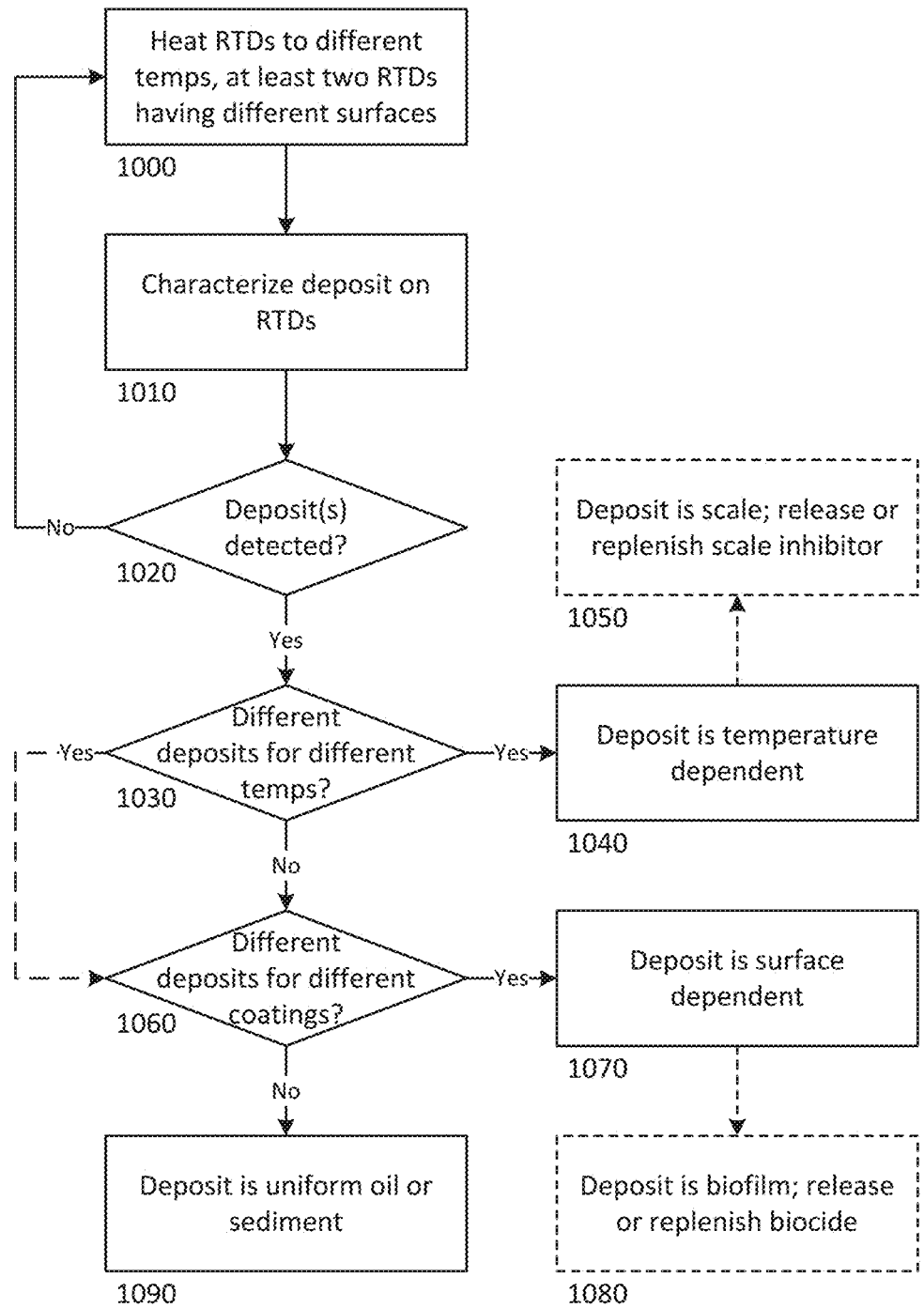
FIG. 10 is a process flow diagram showing an example process for characterizing deposits.

In some embodiments, analysis of RTD surface properties can be used in combination with other analyses to characterize deposits present in a system. FIG. 10 is a process flow diagram showing an example process for characterizing deposits. In the illustrated example, the method includes heating a plurality of RTDs to different temperatures, at least two of the RTDs having different surfaces (e.g., different coatings or coated/uncoated) (step 1000), and characterizing deposit formation on the RTDs (step 1010) to determine if deposits are detected (step 1020). If deposits are not detected, the RTDs can continue being heated (step 1000) and characterized (step 1010) until deposits are detected or the process otherwise is stopped.

Once deposits are detected, the method includes determining whether or not different deposits are present at different temperatures (step 1030), for example, by characterizing and comparing deposits across RTDs that were operated at different temperatures in step 1000. If so, then the deposit is considered temperature dependent (step 1040). In some systems, a temperature dependent deposit likely corresponds to scale (e.g., calcium carbonate or calcium sulfate), and in some examples, the method can include releasing a scale inhibitor into the fluid flow stream, increasing the amount of scale inhibitor flowing into the fluid flow system, or replenishing a supply of scale inhibitor that may have run out though use (step 1050). Additionally or alternatively, corrective actions can include adjusting a pH of the fluid flowing through the system.

If deposits were detected (step 1020), but they are not temperature dependent (step 1030), the method moves to determining whether there are different deposits for RTDs having different coatings (step 1060), for example, by characterizing and comparing deposits across the RTDs having different surfaces. If so, then the deposit is surface dependent (step 1070). As described elsewhere herein, in some examples, different surface characteristics (e.g., due to coatings) of RTDs can include antimicrobial surface vs. a non-antimicrobial surface. If RTDs are distinguished using antimicrobial surfaces and the deposit is surface dependent (step 1070), in some embodiments, the deposit can be considered to include biofilm, and in some examples, the method can include releasing a biocide into the fluid flow stream or replenishing a supply of biocide that may have run out though use (step 1080).

However, if the deposits are not different among RTDs having different temperatures or among RTDs having different surface characteristics (e.g., different coatings), then the deposit is uniform, and in some embodiments, could be due to a variety of materials in the system (1090). For instance, oil sediment, silt, clay, macroscopic debris, or other organic matter may be present in the system. In some examples, a source of such contaminants can be identified and a corresponding corrective action can be taken. Example actions can include treatment, such as performing fluid pretreatment, installation of a filter, installing a mesh or screen into the system.

In some embodiments, methods include assessing both temperature and surface dependency of deposit formation, for example, as shown in broken line showing proceeding to step 1060 even if the answer at step 1030 is "yes." In some such examples, the method can determine if deposits are temperature dependent, surface dependent, or both. Additionally or alternatively, in some examples, steps 1030 and 1060 can be permuted, in which the surface dependence of deposit formation is analyzed before the temperature dependence. In general, various combinations and orders of analyses are possible.

In some embodiments, analysis of the temperature and surface impact on deposit formation can be performed using an example sensor configuration such as shown in FIG. 8. In an example embodiment described with reference to FIG. 8, RTDs 802 and 806 can be coated in coatings 812, 816, respectively, having antimicrobial properties, while RTDs 804, 808 do not include an antimicrobial coating. While described as having antimicrobial coatings in the illustrative example, as described elsewhere herein, coatings can have additional or different characteristics (e.g., a molecular imprinted polymer) that can impact the deposit formation thereon, and coating are not limited to being antimicrobial.

During operation, RTDs 802 (with coating 812) and RTD 804 (without coating) can be heated to a first temperature, and RTDs 806 (with coating 816) and RTD 808 (without coating) can be heated to a second temperature different from the first.

Deposits on each of RTDs 802, 804, 806, 808 can be characterized and compared to determine various information regarding deposits in the system. For example, comparisons between deposits on RTDs 802 and 804 can provide information regarding whether the characteristics of coating 812 (e.g., antimicrobial characteristics) impact deposits at the first temperature. Similarly, comparisons between deposits on RTDs 806 and 808 can provide information regarding whether the characteristics of coating 816 (e.g., antimicrobial characteristics) impact deposits at the second temperature. Comparisons between deposits on RTDs 804 and 808 (or similar between RTDs 802 and 806) can provide information regarding whether the temperature (first temperature vs. second temperature) impacts deposit formation. In some cases, various combinations of such analyses can be performed to determine both the temperature dependence and the surface dependence of deposits.

One or more such analyses can be performed to determine information regarding the formation of deposits. For example, temperature dependence and/or surface dependence can be used to determine the likely types of deposits forming in the system. Knowledge of the type of deposits forming in the system can be used to take appropriate corrective action to reduce or eliminate system deposits, such as releasing or replenishing a one or more chemicals (e.g., a scale inhibitor and/or a biocide).

Other coating properties that can be used to identify deposits or types of deposits include coating wettability, surface energy, surface roughness, or the like. For example, smooth surface coatings, such as a fluoropolymer, may inhibit biofilm growth compared to a rougher surface. Similarly, in some cases, biofilms may preferentially grow on hydrophobic surfaces when compared to hydrophilic surfaces. Other examples of encouraging or discouraging certain deposit formations include coatings based on utilizing zeolites or antigen/antibody relationships. In general, RTDs can be coated in a coating impacts the deposition potential of specific deposits or types of deposits, for example, by inhibiting particular deposit formation, encouraging particular deposit formation, or allowing for only a particular deposit formation. The known characteristics of such coatings in combination with deposit characterizations such as described elsewhere herein can be used to characterize the types of deposits forming at the RTDs.

In some examples, a swellable polymer coating can achieve an equilibrium thermal behavior based on a concentration of a particular component or type of component in the fluid. For instance, in some examples, the amount of a constituent absorbed by the swellable polymer is a function of the concentration of the constituent in the fluid, and thermal characteristics (e.g., thermal conductivity) of the swellable polymer change as a function of the amount of constituent absorbed. In an example implementation, an RTD coated in such a polymer can be heated (e.g., temporarily or maintained at a fixed elevated temperature) and the temperature can be allowed to decay while being measured. The temperature decay profile of the RTD can analyzed to determine the thermal characteristics of the RTD/swellable polymer, which can be the associated with the concentration of a component of interest in the fluid. In some examples, a water swellable polymer can be used to detect an amount of water in a hydrocarbon stream. In other examples, an oil swellable polymer can be used to detect an amount of hydrocarbon in an aqueous stream.

In some examples, thermal characteristics of an RTD having a swellable polymer coating can be compared to those of an RTD not having the swellable polymer coating to provide additional information regarding what is causing the thermal changes (e.g., whether the changes are due to swelling or other deposit formation such as scaling). Additionally or alternatively, a single measurement of the RTD having the swellable polymer can be used to determine the thermal characteristics of the polymer and corresponding information regarding the fluid without comparison to another RTD (e.g., via an equation or lookup table).

In another example, thermal characteristics of a metallic coating susceptible to corrosion (e.g., iron) can be analyzed for changes in thermal behavior. In some examples, detected changes can be attributed to a corrosion product forming on the surface (e.g., iron oxide). In some embodiments, a thermal change on such an RTD can be attributed to corrosion without comparison to another RTD. Additionally or alternatively, thermal characteristics of such an RTD can be compared to those of an RTD coated in a corrosion-resistant material. Corrosion information (e.g., the detection of corrosion of a susceptible coating) can be used to determine information regarding the corrosively of the fluid flowing past the RTD(s).

Additionally or alternatively, as noted elsewhere herein, similar processes can be used in a variety of applications, such as gas flow systems, multiphase fluid flow systems, and the like. For example, in some embodiments, similar techniques as described herein can be used to detect deposits from constituents (e.g., oil) entrained in a gaseous flow, such as in a compressed air system. Thermal characteristics of one or more RTDs can change in response to oil entrained in the gas collecting on the surface of the RTD(s). Similarly, other aspects of a gas can be analyzed, such as condensation temperature of a gas or detection of various components within a gas stream. For example, thermal characteristics of one or more RTDs can change due to the condensation of a gas onto the surface of the RTD(s) or the collection of another component from the gas onto the RTD(s). As described elsewhere herein, in some examples, one or more coatings on the RTD(s) can be used to encourage or discourage such events from occurring on the surface of the RTD(s).

Table 1 below provides a non-exhaustive list of example types of deposits or other surface formation and corresponding surface properties to encourage or discourage the formation of such deposits. In various examples, detection of a particular deposit type can be performed using an RTD having either a deposit-encouraging coating or a deposit-discouraging coating and another RTD having either the other of the deposit-encouraging or deposit-discouraging coating or a natural coating, such that the deposit potential is different between the RTDs.

TABLE 1

Examples of deposit-encouraging and-discouraging surfaces for different deposits/formations

| Deposit/Formation Type | Encouraging Surface | Discouraging Surface |
| --- | --- | --- |
| Oily organic (e.g., paraffin) | Hydrophobic polymers (e.g., polyethylene, polypropylene) | Hydrophilic (e.g., EO, —COOH grafts) |
| Biofilm | Biocompatible (e.g., PU, starch, peptides) | Biocidal (e.g., silver); biostatic (e.g., nanospikes) |
| Silica Particulate (e.g., silt) | Ceramic Micro-roughened | Organic inhibiting surface Non-roughened |
| Corrosion product (e.g., iron oxide) | Metallized surface (e.g., iron) | Inert surface |
| Stickies/Tackies (e.g., in papermaking) | High wettability | Low wettability |

While several examples are described with respect to detecting deposits, various configurations can be used to generally detect changes to the RTD coatings. For example, in some embodiments, methods can include observing changes in thermal behavior in one or more RTDs, for example due to corrosion of an RTD coating or sorption of one or more constituents onto/into an RTD coating. In general, changes in thermal characteristics can be detected and associated with a given RTD surface property (or a comparison of RTDs with different surface properties), which can be used to determine information regarding the fluid flowing through the system.

Figure 11:
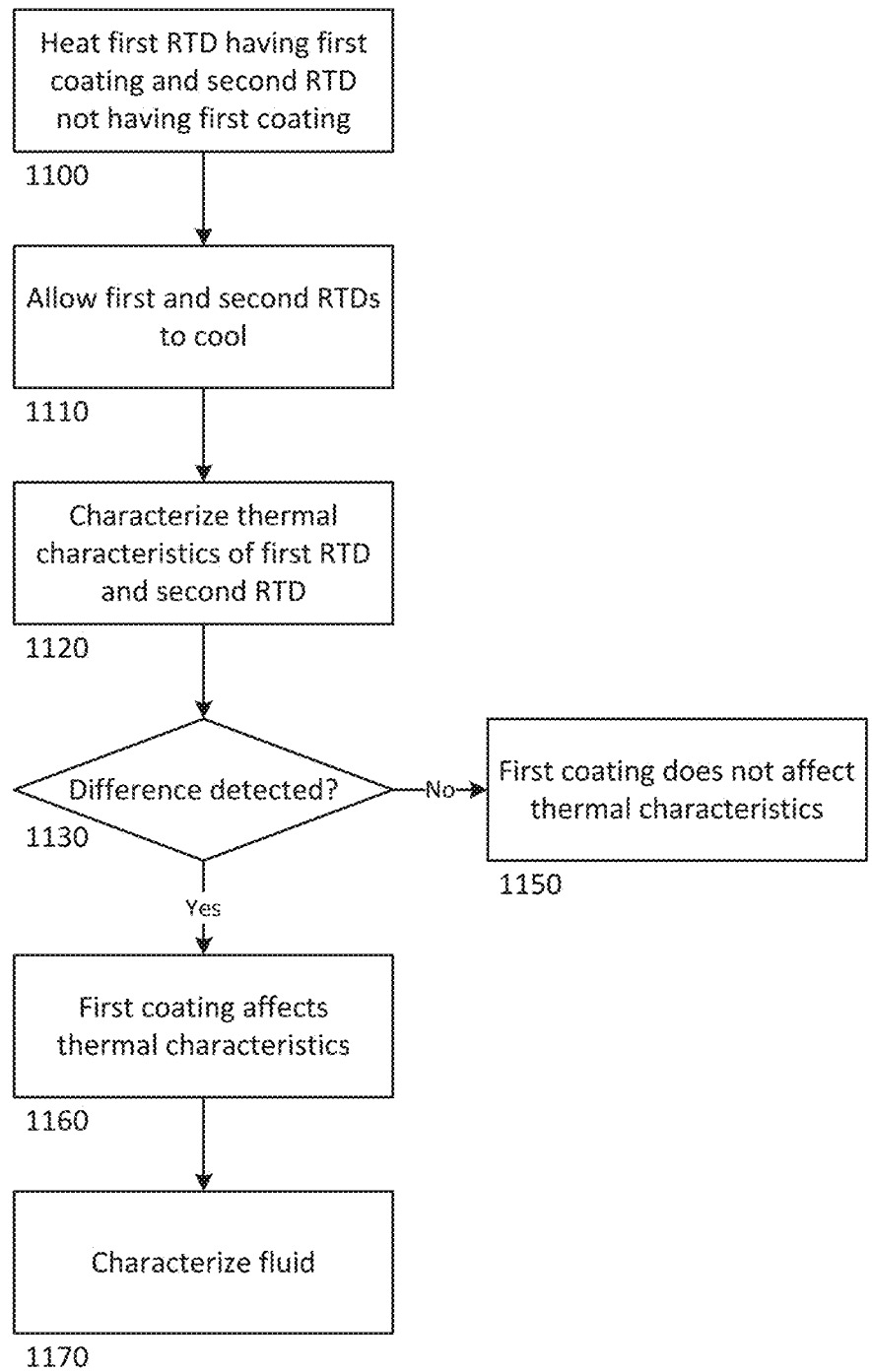
FIG. 11 shows a process flow diagram showing a generalized method of using surface functionalization to determine information regarding fluid flowing through a system.

FIG. 11 shows a process flow diagram showing a generalized method of using surface functionalization to determine information regarding fluid flowing through a system. The method shown in FIG. 11 includes heating a first RTD having a first coating and a second RTD not having the first coating (1100) and allowing the first and second RTDs to cool (1110). The method further includes characterizing thermal characteristics of the first and second RTDs (1120), for example, by monitoring a temperature decay profile of each of the RTDs.

The thermal characteristics of the RTDs can be compared to determine whether or not there is a difference in the thermal characteristics of the RTDs (1130). If not, then the first coating does not impact the thermal characteristics of the RTD (1150). However, if a difference is detected, then the first coating does affect the thermal characteristics (1160).

In some examples, determining that the first coating affects the thermal characteristics of the RTD can be used to characterize the fluid (1170). For instance, in various examples, the affecting the thermal characteristics can be due to preventing a biofilm deposit (e.g., via an antimicrobial first coating), corrosion of a coating (e.g., due to a metalized coating), due to sorption of a fluid constituent (e.g., due to a swellable polymer coating). Such determinations can be attributed to fluid characteristics, such as the presence of microbes, corrosivity of the fluid, the presence of a particular constituent in the fluid, etc.

In some examples, processes described herein can be performed automatically, for example, via a system controller. For example, as shown in and described with respect to FIG. 3, controller 312 can be used to control the heating of various RTDs and to determine the temperature of the RTDs. In some examples, the controller can be configured to characterize deposits on or other thermal characteristic changes of one or more such RTDs via processes described herein, for example, as described with respect to FIGS. 6A-6D.

In some examples, the controller can be programmed with or otherwise capable of determining information regarding the coatings on RTDs in communication therewith and/or the fluid contacting the RTDs. The controller can perform deposit characterizations such as described herein and associate deposits with different surface properties to determine the types of deposits present in the system. Additionally or alternatively, the controller can perform fluid characterizations based on changes in thermal characteristics of one or more RTDs in view of the RTD coating(s).

In some examples, the controller can be configured to perform one or more corrective actions automatically. For instance, in an example embodiment, a controller can be configured to compare deposits forming on an RTD coated in antimicrobial coating and an RTD not coated in an antimicrobial coating, and determine whether or not the antimicrobial coating reduces deposits. If so, the controller can be configured to cause a corrective action to be performed, such as by controlling a pump and/or valve, for example, to release a chemical (e.g., a biocide) to address biofilm deposits, or by alerting a user of a biofilm deposit event so that the user may take appropriate action.

In some embodiments, a controller can include or otherwise be in communication with a database including information for determining information regarding a detected deposit, such as determining a type of deposit and/or appropriate corrective actions. In some examples, the controller can utilize a lookup table or equation to determine such information.

FIG. 12 shows an example lookup table for a plurality of surface characteristics and temperatures. As shown, the lookup table in FIG. 12 includes M different surface characteristics and N different temperatures, resulting in M×N combinations. In some examples, possible surface characteristics include an antimicrobial coating, a metallic coating (e.g., susceptible to corrosion), a swellable polymer coating, or other deposit-encouraging or -discouraging surface characteristics. In an example embodiment, Surface 1 represents an antimicrobial surface, while Surface 2 represents a surface not having antimicrobial properties.

During operation, one or more RTDs having certain surface characteristics can be operated at one or more temperatures. In some examples, one or more temperatures (e.g., of Temperature 1, . . . , Temperature N) corresponds to an equilibrium fluid temperature, wherein the RTD is not heated. Each RTD can have a surface characteristic and a temperature such that the RTD corresponds to an entry in the lookup table of FIG. 12. A thermal characterization (e.g., calculating a thermal decay time constant) can be performed for each of the one or more RTDs to assess any changes in thermal properties.

In some examples, detection of a surface change on a particular RTD (e.g., detection of a deposit) can be used to determine information regarding the deposit and/or trigger one or more corrective actions. Additionally or alternatively, in some examples, analysis of thermal characteristics of a plurality of RTDs within the table can provide information regarding deposit formation and/or initiate one or more corrective actions.

For instance, in an example embodiment, two RTDs having surface characteristic 1 can be heated to Temperature 1 and Temperature 2, respectively, and two RTDs having surface characteristic 2 can be heated to Temperature 1 and Temperature 2, respectively. Comparisons between the deposits detected at each such RTD in the table (e.g., changes in thermal characteristics, e.g., thermal decay profile, heat transfer characteristics, etc., indicative of deposits) can be used to determine the impact of surface characteristics 1 and 2 as well as temperatures 1 and 2.

In various embodiments, combinations of entries in the table of FIG. 12 can be preprogrammed for performing different fluid and/or deposit characterizations based on predetermined combinations of surface characteristics and temperatures.

In some embodiments, combinations of fluid constituents can impact the deposition characteristics in a fluid system over time. For instance, in an example scenario, scale deposits may initially coat an otherwise antimicrobial coating of an RTD, potentially allowing for subsequent biofilm deposits on the RTD, possibly in combination with additional scale deposits. Additionally, in some such instances, deposits can become thick enough to reduce the ability of the RTD to increase the surface temperature of the deposits. Reduced temperature may inhibit the deposition of scale, and may eventually lead to only biofilm deposits.

Thus, in some situations, it is possible that the nature of deposits evolves over time as different deposits form at each RTD. In some embodiments, deposits at one or more RTDs can be characterized over time to analyze trends and/or changes in deposit formation. For example, in some embodiments, changes in the rate of deposit over time can be analyzed, for instance, to indicate a change in the types of deposit forming at an RTD.

In an example implementation, a first rate of deposit formation on an RTD coated in antimicrobial material is detected initially and then a second rate of deposit formation greater than the first is detected at a later point in time could indicate initial deposition of scale or sediment, and once the antimicrobial coating was covered, biofilm deposition as well.

To address such possibilities, in some embodiments, time characteristics of deposits or other surface properties (e.g., sorption of a constituent via a swellable polymer, surface corrosion, etc.) can be analyzed (e.g., deposition thickness over time, deposition rates over time, etc.). Additionally or alternatively, analysis can be performed in a window of time before deposits on the RTD impact subsequent deposit formation. For example, initial deposit formation on an RTD having an antimicrobial coating can be assessed (e.g., via processes shown in FIGS. 9 and 10) before other deposit types (e.g., scale or sediment) impact the antimicrobial properties of the RTD.

In general, as described elsewhere herein, surface functionalizations other than antimicrobial surfaces can be used in a similar way to identify and address deposits. RTD temperature control and/or measurements can be performed in various ways, such as described, for example, in U.S. Patent Publication No. US 2018/0073996 A1, entitled "DEPOSIT MONITOR" (corresponding to U.S. patent application Ser. No. 15/262,807, filed Sep. 12, 2016, and which is assigned to the assignee of the instant application), which is incorporated herein by reference.

While generally described herein as being applied to RTDs, other thermoelectric devices (e.g., Peltier devices) can be used to characterize deposits in a system, such as described in U.S. Patent Publication No. US 2018/0245865 A1, entitled "THERMOELECTRIC DEPOSIT MONITOR" (corresponding to U.S. patent application Ser. No. 15/442, 221, filed Feb. 24, 2017, and which is assigned to the assignee of the instant application), which is incorporated herein by reference. Similar to described with respect to RTDs here, coatings (e.g., antimicrobial coatings, molecular imprinted polymers, etc.) can be applied to such thermoelectric devices for analyzing the effects of such coatings on deposits forming on the thermoelectric devices. For instance, in some examples, a Peltier or similar device can be used to detect condensation characteristics of a gas (e.g., condensation temperature of a gas, constituents of the gas stream, etc.).

Various embodiments have been described. Such examples are non-limiting, and do not define or limit the scope of the invention in any way. Rather, these and other examples are within the scope of the following embodiments.

The invention claimed is:

1. A method for characterizing a process fluid comprising:
applying electrical power to a first resistance temperature detector (RTD) in contact with a fluid to increase the temperature of the first RTD, the first RTD having a first coating;
allowing the first RTD to cool toward a fluid equilibrium temperature;
analyzing the temperature decay profile of the first RTD over time as it cools toward the fluid equilibrium temperature to determine thermal characteristics of the first RTD;
applying electrical power to a second RTD in contact with the fluid to increase the temperature of the second RTD, the second RTD having a second coating different from the first coating;
allowing the second RTD to cool toward the fluid equilibrium temperature;
analyzing the temperature decay profile of the second RTD over time as it cools toward the fluid equilibrium temperature to determine thermal characteristics of the second RTD;
comparing the thermal characteristics of the first RTD and the second RTD;
determining one or more characteristics of the fluid based on the comparison; and
performing a corrective action in response to the determined one or more characteristics.

2. The method of claim 1, wherein the first coating comprises an antimicrobial material and the second coating is not antimicrobial.

3. The method of claim 2, wherein performing the corrective action comprises adding a biocide to the fluid.

4. The method of claim 1, wherein the first coating is hydrophobic and the second coating is hydrophilic.

5. The method of claim 1, wherein the first coating is roughened and the second coating is smooth.

6. The method of claim 1, wherein the first coating is metallized and the second coating has a surface that is inert.

7. The method of claim 1, wherein the first coating has a surface with high wettability and the second coating has a surface with a low wettability.

8. The method of claim 1, wherein
the determined thermal characteristics of the first RTD comprise a thickness of a first deposit formed on the first RTD by the fluid;
the determined thermal characteristics of the second RTD comprise a thickness of a second deposit formed on the second RTD by the fluid; and
comparing the thermal characteristics of the first RTD and the second RTD comprises comparing the thickness of the first deposit and the thickness of the second deposit.

9. The method of claim 8, wherein the determining one or more characteristics of the fluid is based on the comparison of the thickness of the first deposit and the thickness of the second deposit and differences between the first coating and the second coating.

10. The method of claim 8, wherein:
the determined thermal characteristics of the first RTD comprises a rate of change of the thickness of the first deposit formed on the first RTD; and
the determined thermal characteristics of the second RTD comprises a rate of change of the thickness of the second deposit formed on the second RTD.

11. The method of claim 8, further comprising determining a temperature dependence of deposit formation on the first RTD and the second RTD.

12. The method of claim 11, wherein the determining a temperature dependence of deposit formation on the first RTD and the second RTD comprises:
applying electrical power to a third RTD in contact with the fluid to maintain the temperature of the third RTD at a temperature above the fluid equilibrium temperature of the fluid, the third RTD having the first coating;
allowing the third RTD to cool toward the fluid equilibrium temperature;
analyzing the temperature decay profile of the third RTD over time as it cools toward the fluid equilibrium temperature to determine thermal characteristics of the third RTD; and
comparing the thermal characteristics of the first RTD and the third RTD.

13. A system comprising:
a first resistance temperature detector (RTD), the first RTD having a first coating;
a second RTD, the second RTD not having the first coating;
a power source in communication with the first RTD and being configured to provide electrical power to the first RTD; and
a controller in communication with the first RTD and the power source and being configured to:
cause the power source to provide electrical power to the first RTD;
stop applying electrical power to the first RTD:
measure the temperature of the first RTD over time after stopping applying the electrical power to the first RTD;
measure a thermal characteristic of the first RTD based on the measured temperature over time;
cause the power source to provide electrical power to the second RTD;
stop applying electrical power to the second RTD;
measure the temperature of the second RTD over time after stopping applying the electrical power to the second RTD;
measure a thermal characteristic of the second RTD based on the measured temperature over time;
compare the measured thermal characteristic of the second RTD to the measured characteristic of the first RTD;
determine one or more characteristics of a fluid in contact with the first RTD based on the comparison between the thermal characteristics of the first RTD and the second RTD, and
perform a corrective action in response to the one or more determined characteristics.

14. The system of claim 13, wherein the first coating comprises a swellable polymer, and wherein determining one or more characteristics of the fluid comprises determining a concentration of a constituent in the fluid that is absorbable by the swellable polymer.

15. The system of claim 13, wherein the first coating comprises an antimicrobial coating, and wherein determining one or more characteristics of the fluid comprises determining the presence of microbes in the fluid.

16. The system of claim 15, wherein the controller is configured to cause a biocide to be applied to the fluid if microbes are determined to be present in the fluid.

17. The system of claim 13, wherein the first coating comprises a metalized surface susceptible to corrosion, and wherein determining one or more characteristics of the fluid comprises determining a corrosivity the fluid.

18. The system of claim 13, wherein the measuring the thermal characteristic of the first RTD comprises measuring a thermal decay characteristic of the first RTD when power is stopped being applied to the first RTD; and the measuring the thermal characteristic of the second RTD comprises measuring a thermal decay characteristic of the second RTD when power is stopped being applied to the second RTD.

19. A system comprising:

a first resistance temperature detector (RTD), the first RTD having a first coating;

a power source in communication with the first RTD and being configured to provide electrical power to the first RTD; and a controller in communication with the first RTD and the power source and being configured to:

cause the power source to provide electrical power to the first RTD;

stop applying electrical power to the first RTD:

measure the temperature of the first RTD over time after stopping applying the electrical power to the first RTD;

measure a thermal characteristic of the first RTD based on the measured temperature over time;

determine one or more characteristics of a fluid in contact with the first RTD based on the measured thermal characteristic of the first RTD; and perform a corrective action in response to the one or more determined characteristics; and wherein first coating comprises a swellable polymer; and determining one or more characteristics of the fluid comprises determining a concentration of a constituent in the fluid that is absorbable by the swellable polymer.

20. The system of claim 19, wherein the controller is configured to determine one or more thermal characteristics of the swellable polymer, the one or more thermal characteristics being associated with the concentration of the constituent in the fluid.

* * * * *